(12) United States Patent
Wang et al.

(10) Patent No.: US 10,953,497 B2
(45) Date of Patent: Mar. 23, 2021

(54) METHOD FOR LASER WELDING STEEL WORKPIECES

(71) Applicant: GM GLOBAL TECHNOLOGY OPERATIONS LLC, Detroit, MI (US)

(72) Inventors: Hui-Ping Wang, Troy, MI (US); Yu Pan, Shanghai (CN); Blair E. Carlson, Ann Arbor, MI (US); Joshua L. Solomon, Detroit, MI (US); William P. Payne, Macomb, MI (US); David Yang, Shanghai (CN); Wu Tao, Tianmen (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 214 days.

(21) Appl. No.: 16/085,283

(22) PCT Filed: Nov. 23, 2016

(86) PCT No.: PCT/CN2016/106914
§ 371 (c)(1),
(2) Date: Sep. 14, 2018

(87) PCT Pub. No.: WO2017/173833
PCT Pub. Date: Oct. 12, 2017

(65) Prior Publication Data
US 2019/0118307 A1    Apr. 25, 2019

(30) Foreign Application Priority Data

Apr. 8, 2016  (WO) ................ PCT/CN2016/078790

(51) Int. Cl.
*B23K 26/60*  (2014.01)
*B23K 26/26*  (2014.01)
(Continued)

(52) U.S. Cl.
CPC ............ *B23K 26/60* (2015.10); *B23K 26/082* (2015.10); *B23K 26/244* (2015.10); *B23K 26/26* (2013.01);
(Continued)

(58) Field of Classification Search
CPC .... B23K 26/60; B23K 26/082; B23K 26/244; B23K 26/26; B23K 26/322; B23K 2101/006
(Continued)

(56) References Cited

U.S. PATENT DOCUMENTS 4,684,779 A     8/1987  Berlinger et al.
4,873,415 A *  10/1989  Johnson ................ B23K 26/24
                                                        219/121.64
(Continued)

FOREIGN PATENT DOCUMENTS

CN    103100795 A    5/2013
CN    103831531 A    6/2014
(Continued)

OTHER PUBLICATIONS

International Search Report and Written Opinion for application No. PCT/CN2016/078790 dated Jan. 3, 2017, 3 pages.
(Continued)

*Primary Examiner* — Thien S Tran
(74) *Attorney, Agent, or Firm* — Reising Ethington P.C.

(57) ABSTRACT

A method of laser welding a workpiece stack-up (10) of overlapping steel workpieces (12, 14) involves heat-treating a region (64) of the stack-up (10) followed by forming a laser weld joint (66) that is located at least partially within the heat-treated region (64). During heat-treating, one or more pre-welding laser beams (68) are sequentially directed at a top surface (20) of the workpiece stack-up (10) and advanced along a pre-welding beam travel pattern (70) so as
(Continued)

to reduce an amount of vaporizable zinc within the stack-up (10). Thereafter, the laser weld joint (66) is formed by directing a welding laser beam (82) at the top surface (20) of the workpiece stack-up (10) and advancing the welding laser beam (82) along a welding beam travel pattern (84) that at least partially overlaps with a coverage area of a pre-welding beam travel pattern (70) or a shared coverage area portion of multiple pre-welding beam travel patterns (70). The method can help reduce an amount of vaporizable zinc within the stack-up (10).

15 Claims, 9 Drawing Sheets

(51) Int. Cl.
| | |
|---|---|
| *B23K 26/322* | (2014.01) |
| *B23K 26/082* | (2014.01) |
| *B23K 26/244* | (2014.01) |
| *B23K 101/00* | (2006.01) |
| *B23K 101/18* | (2006.01) |
| *B23K 101/34* | (2006.01) |
| *B23K 103/04* | (2006.01) |

(52) U.S. Cl.
CPC ...... *B23K 26/322* (2013.01); *B23K 2101/006* (2018.08); *B23K 2101/185* (2018.08); *B23K 2101/34* (2018.08); *B23K 2103/04* (2018.08)

(58) Field of Classification Search
USPC ............................ 219/78.14, 121.63, 121.64
See application file for complete search history.

(56) References Cited

U.S. PATENT DOCUMENTS

| | | | | |
|---|---|---|---|---|
| 2011/0139753 | A1* | 6/2011 | Lee ...................... | B23K 26/244 |
| | | | | 219/121.64 |
| 2015/0174702 | A1* | 6/2015 | Fujimoto ............... | B23K 26/60 |
| | | | | 428/594 |
| 2017/0001261 | A1* | 1/2017 | Fujiwara ............... | B23K 26/244 |
| 2017/0095886 | A1* | 4/2017 | Gu ........................ | B23K 26/322 |
| 2018/0009060 | A1 | 1/2018 | Yang et al. | |
| 2018/0043472 | A1 | 2/2018 | Yang et al. | |

FOREIGN PATENT DOCUMENTS

| | | | |
|---|---|---|---|
| EP | 0579205 | A1 | 1/1994 |
| EP | 1249301 | A1 | 10/2002 |
| FR | 2790689 | A1 * | 9/2000 |
| FR | 2790689 | A1 | 9/2000 |
| FR | 2798084 | A1 | 3/2001 |
| FR | 2823459 | A1 | 10/2002 |
| WO | WO-2015192219 | A1 * | 6/2015 |
| WO | WO-2015104781 | A1 * | 7/2015 |
| WO | 2016032416 | A1 | 3/2016 |
| WO | 2016192039 | A1 | 12/2016 |
| WO | 2017035728 | A1 | 3/2017 |
| WO | 2017035729 | A1 | 3/2017 |
| WO | 2017075808 | A1 | 5/2017 |
| WO | 2017156723 | A1 | 9/2017 |
| WO | 2017173650 | A1 | 10/2017 |
| WO | 2017173833 | A1 | 10/2017 |

OTHER PUBLICATIONS

International Search Report and Written Opinion for application No. PCT/CN2016/106914 dated Feb. 14, 2017, 9 pages.

Yang et al., U.S. Appl. No. 15/684,398 entitled "Method for Laser Welding of Curved Surfaces," filed Aug. 23, 2017.

* cited by examiner

METHOD FOR LASER WELDING STEEL WORKPIECES

CROSS-REFERENCE TO RELATED APPLICATION

This application claims priority to PCT/CN2016/078790, filed internationally on Apr. 8, 2016, the entire contents of which are incorporated herein by reference.

TECHNICAL FIELD

The technical field of this disclosure relates generally to laser welding and, more particularly, to a method of laser welding together two or more overlapping steel workpieces.

BACKGROUND

Laser welding is a metal joining process in which a laser beam is directed at a metal workpiece stack-up to provide a concentrated energy source capable of effectuating a weld joint between the overlapping constituent metal workpieces. In general, two or more metal workpieces are first aligned and stacked relative to one another such that their faying surfaces overlap and confront to establish a faying interface (or faying interfaces) that extends through an intended weld site. A laser beam is then directed towards and impinges a top surface of the workpiece stack-up. The heat generated from the absorption of energy from the laser beam initiates melting of the metal workpieces down through the metal workpiece impinged by the laser beam and into the underlying metal workpiece(s) to a depth that intersects each of the established faying interfaces. And, if the power density of the laser beam is high enough, a keyhole is produced within the workpiece stack-up. A keyhole is a column of vaporized metal derived from the metal workpieces within the workpiece stack-up that may include plasma. The keyhole is surrounded by molten workpiece metal and is an effective absorber of energy from the laser beam.

The laser beam creates the molten pool and the keyhole, if present, in very short order once it impinges the top surface of the workpiece stack-up. After the metal workpieces are initially melted, the laser beam may be advanced relative to the top surface of the workpiece stack-up, which has conventionally involved moving the laser beam along a weld path of relatively simple geometry. As the laser beam is advanced along the top surface of the stack-up, the molten workpiece metal flows around and behind the advancing laser beam within the workpiece stack-up. This penetrating molten workpiece metal quickly solidifies in the wake of the advancing laser beam into resolidified metal workpiece material. Eventually, the transmission of the laser beam at the top surface of the workpiece stack-up is ceased, at which time the keyhole collapses, if present, and any molten workpiece metal still remaining within the stack-up solidifies. The collective resolidified metal workpiece material obtained by operation of the laser beam constitutes a laser weld joint that autogenously fusion welds the overlapping metal workpieces together.

The automotive industry is interested in using laser welding to manufacture parts that can be installed on a vehicle. In one example, a vehicle door body may be fabricated from an inner door panel and an outer door panel that are joined together by a plurality of laser welds. The inner and outer door panels are first stacked relative to each other and secured in place by clamps. A laser beam is then successively directed at multiple weld sites around the stacked panels in accordance with a programmed sequence to form the plurality of laser weld joints. The process of laser welding inner and outer door panels—as well as other vehicle component parts such as those used to fabricate hoods, deck lids, body structures such as body sides and cross-members, load-bearing structural members, engine compartments, etc.—is typically an automated process that can be carried out quickly and efficiently. The aforementioned desire to laser spot weld metal workpieces is not unique to the automotive industry; indeed, it permeates to other industries that may utilize laser welding including the aviation, maritime, railway, and building construction industries, among others.

The use of laser welding to join together certain metal workpieces often used in manufacturing practices can present challenges. For example, steel workpieces often include a surface coating of a zinc-based material (e.g., zinc or a zinc alloy) for corrosion protection. Zinc has a boiling point of about 906° C., while the melting point of the underlying base steel substrate it coats is typically greater than 1300° C. Thus, when a steel workpiece that includes a surface coating of a zinc-based material is laser welded, high-pressure zinc vapors are readily produced at the surfaces of the steel workpiece and have a tendency to disrupt the laser welding process. In particular, the zinc vapors produced at the faying interface(s) of the stacked steel workpieces can diffuse into the molten steel created by the laser beam unless an alternative escape outlet is provided through the workpiece stack-up. When an adequate escape outlet is not provided, zinc vapors may remain trapped in the molten steel as it cools and solidifies, which may lead to defects in the resulting laser weld joint, such as porosity, as well as other weld joint discrepancies including blowholes, spatter, and undercut joints. These weld joint deficiencies, if sever enough, can unsatisfactorily degrade the mechanical properties of the laser weld joint.

To deter high-pressure zinc vapors from diffusing into the molten steel, conventional manufacturing procedures have called for laser scoring or mechanical dimpling at least one of the two steel workpieces at each faying interface where a zinc-based coating is present before laser welding is conducted. Each of those techniques creates spaced apart protruding features that impose a gap of about 0.2-0.8 millimeters between the faying surfaces involved, which provides an escape path to guide zinc vapors along the faying interface and away from the weld site. But the formation of these protruding features adds an additional step to the overall laser welding process that is often carried out by dedicated scoring/dimpling equipment. Furthermore, the formation of protruding features may require the implementation of extra provisions to help counteract undercut weld joints. It would therefore be a welcome addition to the art if two or more steel workpieces—at least one of which includes a surface coating of a zinc-based material—could be laser welded together without having to necessarily score or dimple any of the steel workpieces in order to consistently form a durable weld joint with sufficient strength and other mechanical properties.

SUMMARY OF THE DISCLOSURE

A method of laser welding a workpiece stack-up that includes overlapping steel workpieces is disclosed. The workpiece stack-up includes two or more steel workpieces, and at least one of those steel workpieces (and sometimes all of the steel workpieces) includes a surface coating of a zinc-based material such as, for example, hot dip galvanized or electrogalvanized zinc or a galvannealed zinc-iron alloy. The zinc-based material surface coating preferably has a thickness that ranges from 2 μm to 50 μm. And while a zinc-based surface coating protects the underlying steel from corrosion, among other notable benefits, it can evolve high pressure zinc vapors when heated during laser welding. The evolution of such zinc vapors, in turn, can be a source of porosity in the laser weld joint and can also lead to other abnormalities such as spatter. The disclosed laser welding method minimizes the impact that zinc-based surface coatings may have on the laser weld joint without requiring—but of course not prohibiting—the practice of certain procedures such as, for example, the intentional imposition of gaps between the steel workpieces at the faying interface(s) where the zinc-based surface coating is present by way of laser scoring or mechanical dimpling.

To begin, the laser welding method involves providing a workpiece stack-up that includes two or more overlapping steel workpieces. The steel workpieces are fitted and stacked together such that a faying interface is formed between the faying surfaces of each pair of adjacent overlapping steel workpieces at a predetermined weld site. For example, in one embodiment, the workpiece stack-up includes first and second steel workpieces having first and second faying surfaces, respectively, that overlap and confront one another to establish a single faying interface. In another embodiment, the workpiece stack-up includes an additional third steel workpiece situated between the first and second steel workpieces. In this way, the first and second steel workpieces have first and second faying surfaces, respectively, that overlap and confront opposed third and fourth faying surfaces of the third steel workpiece to establish first and second faying interfaces. When a third steel workpiece is present, the first and second steel workpieces may be separate and distinct parts or, alternatively, they may be different portions of the same part, such as when an edge of one part is folded over a free edge of another part.

After the workpiece stack-up is provided, the disclosed method calls for heat-treating a region of the workpiece stack-up. Such an activity heats and vaporizes at least one surface coating of a zinc-based material so as to reduce the amount of vaporizable zinc within the heat-treated region. In other words, some or all of the zinc component of the surface coating(s) within the heat-treated region is vaporized, released, and purged from the region so that there is less vaporizable zinc to be encountered during the subsequent formation of a laser weld joint that encroaches upon the heat-treated region and autogenously fusion welds the several overlapping steel workpieces together. The selected region of the workpiece stack-up is heat-treated with one or more pre-welding laser beams. Each of the pre-welding laser beams, more specifically, is directed at the top surface of the workpiece stack-up and advanced relative to a plane of the top surface along a pre-welding beam travel pattern which, in turn, translates a preliminary molten steel pool along a corresponding route within the workpiece stack-up to cause the release of zinc vapors. A wide variety of pre-welding beam travel patterns may be employed with each pattern having a coverage area on the top surface of the workpiece stack-up that corresponds to the area within which the associated pre-welding laser beam is advanced.

The one or more pre-welding laser beam(s) may reduce the amount of vaporizable zinc within the heat-treated region in several ways. For instance, when the workpiece stack-up includes only the first and second steel workpieces, a pre-welding laser beam may be directed at the top surface of the stack-up and advanced relative to a plane of the top surface along a pre-welding beam travel pattern having a coverage area. The preliminary molten steel pool created by the pre-welding laser beam may partially penetrate into the first steel workpiece during its translation through the stack-up; that is, the preliminary molten steel pool penetrates into the first steel workpiece but does not traverse the faying interface and extend into the underlying adjacent second steel workpiece. The penetrating preliminary molten steel pool may heat and vaporize at least one surface coating of a zinc-based material to release zinc vapors as it moves throughout the workpiece stack-up. The released zinc vapors may be expelled away from the stack-up if released at the top surface of the stack-up, and/or they may be driven laterally outward along the faying interface as a result of their high pressure and the absence of a direct diffusion pathway into the preliminary molten steel pool. Heat conduction through the workpiece stack-up may even cause zinc vapors to be released and expelled at the bottom surface of the stack-up. In another embodiment, the penetrating preliminary molten steel pool may extend close enough to the faying interface that it actually roughens the faying surface of the first steel workpiece to aid in the escape of any released zinc vapors.

In instances where the workpiece stack-up includes the first, second, and third steel workpieces, a first pre-welding laser beam and a second pre-welding laser beam may be used to heat-treat the designated region of the stack-up. In particular, the first pre-welding laser beam may be directed at the top surface of the stack-up and advanced relative to a plane of the top surface along a first pre-welding beam travel pattern having a first coverage area. The first preliminary molten steel pool created by the first pre-welding laser beam may partially penetrate into the first steel workpiece during its translation through the stack-up; that is, the first preliminary molten steel pool penetrates into the first steel workpiece but does not traverse the first faying interface and extend into the underlying adjacent third steel workpiece. After the first pre-welding laser beam has completed its run, the second pre-welding laser beam may be directed at the top surface of the workpiece stack-up and advanced relative to a plane of the top surface along a second pre-welding beam travel pattern having a second coverage area that at least partially overlaps with the first coverage area to provide a shared coverage area portion. The second preliminary molten steel pool created by the second pre-welding laser beam may partially penetrate into the third steel workpiece during its translation through the stack-up; that is, the second preliminary molten steel pool penetrates through the first steel workpiece and into the third steel workpiece, but does not traverse the second faying interface and extend into the underlying adjacent second steel workpiece.

The use of the first and second pre-welding laser beams to create the progressively penetrating first and second preliminary molten steel pools and to translate those molten steel pools through the workpiece stack-up, one after another, helps to effectively heat and vaporize at least one surface coating of a zinc-based material and to release and purge zinc vapors from the heat-treated zone. The first preliminary molten steel pool starts by expelling zinc vapors away from the stack-up if released at the top surface and by further driving zinc vapors laterally outward along the first faying interface if zinc vapors are produced in that area. The second preliminary molten steel pool then continues the process by driving zinc vapors laterally outward along the second faying interface if zinc vapors are produced in that area as well as possibly expelling zinc vapors away from the stack-up if released at the bottom surface as a consequence of heat conduction. Moreover, like before, the first and second pre-welding laser beams may create first and second preliminary molten steel pools that extend close enough to the first and second faying interfaces, respectively, that the resultant preliminary steel pools roughen the first faying surface of the first steel workpiece and the fourth faying surface of the third steel workpiece to aid in the escape of released zinc vapors.

After heat-treating the designated region of the workpiece stack-up, a welding laser beam is operated to form a laser weld joint located at least partially within the heat-treated region of the workpiece stack-up. The laser weld joint is comprised of resolidified steel workpiece material and extends into the workpiece stack-up across each established faying interface so as to autogenously fusion weld the overlapping steel workpieces together. To form the laser weld joint, the welding laser beam is directed at the top surface of the workpiece stack-up to create a primary molten steel pool that penetrates into the workpiece stack-up from the top surface towards the bottom surface. The power density of the welding laser beam is preferably selected to carry out this portion of the laser welding method at least partially in keyhole welding mode. Once the primary molten steel pool is created, the welding laser beam is advanced relative to a plane of the top surface of the stack-up along a welding beam travel pattern to translate the primary molten pool along a corresponding route within the stack-up. The welding beam travel pattern is comprised of one or more nonlinear weld paths and at least partially overlaps with the coverage area of one pre-welding laser beam or the shared coverage area portion of two pre-welding laser beams on the top surface. And, during advancement of the welding laser beam along the welding beam travel pattern, the primary molten steel pool and a keyhole penetrated into the workpiece stack-up and traverse each faying interface established within the stack-up at least part of the time.

In a preferred embodiment, a remote laser welding apparatus is used to transmit, in order, the one or more pre-welding laser beams and the welding laser beam to the workpiece stack-up. The remote laser welding apparatus includes a scanning optic laser head that houses optical components that can move a laser beam relative to the plane at the top surface of the workpiece stack-up and also adjust a focal point of the laser beam up or down along a longitudinal beam axis. Separate and distinct pre-welding and welding laser beams can thus be transmitted from the scanning optic laser head as needed to practice the disclosed laser welding method. In that regard, the designation of the laser beams as "pre-welding" and "welding" in this disclosure is not necessarily intended to indicate a difference in laser beam type, although such variations are not foreclosed, but rather is meant to specify the sequence in which the laser beams act on the workpiece stack-up and to differentiate their intended function within the overall laser welding method. Specifically, the one or more pre-welding laser beams are employed to heat-treat a region of the workpiece stack-up and to reduce the amount of vaporizable zinc within that region, and the welding laser beam is employed after the pre-welding laser beam(s) to form a laser weld joint that structurally fusion welds the overlapping steel workpieces together while being located at least partially within the heat-treated region.

The act of heat-treating the designated region of the workpiece stack-up in preparation of forming the laser weld joint is believed to have a positive effect on the strength and other mechanical properties of the laser weld joint. By heat-treating the region to reduce the amount of vaporizable zinc therein, a noticeably less amount of zinc vapors, if any at all, is liberated during the subsequent formation of the laser weld joint depending on the extent to which the joint is located within the heat-treated region. The proliferation of entrained porosity within the laser weld joint, as well as other weld abnormalities, is thus minimized in comparison to traditional laser welding methods that do not include a heat treatment stage prior to forming the laser weld joint, thus leading to better joint strength and other mechanical properties. Such enhanced laser weld joint properties moreover, can be attained without having to necessarily score, dimple, or otherwise intentionally impose gaps between each pair of overlapping steel workpieces in order to facilitate zinc vapor escape, although such practices certainly are not prohibited as part of the disclosed laser welding method. In an effort to obtain the greatest benefit from the heat-treated region, a preferred embodiment of the disclosed laser welding method calls for forming the laser weld joint such that the weld joint is entirely contained within the heat-treated region at the top surface of the workpiece stack-up.

DETAILED DESCRIPTION

The disclosed method of laser welding a workpiece stack-up comprised of two or more overlapping steel workpieces involves two stages: (1) heat-treating a region of the workpiece stack-up to, in effect, reduce an amount of vaporizable zinc within that region by heating and vaporizing at least one steel workpiece surface coating comprised of a zinc-based material using one or more pre-welding laser beams, and (2) forming a laser weld joint that autogenously fusion welds the overlapping steel workpieces together by advancing a welding laser beam relative to a plane of the top surface of the stack-up along a welding beam travel pattern comprised of one or more nonlinear weld paths such that the laser weld joint is located at least partially within the heat-treated region. The practice of heat-treating the designated region of the workpiece stack-up followed by forming the laser weld joint helps minimize the proliferation of entrained porosity within the resolidified steel workpiece material of the laser weld joint attributable to zinc vapors, thus leading to enhanced strength and other mechanical properties in the weld joint. The pre-welding laser beam(s) and the welding laser beam are preferably sequentially transmitted to the workpiece stack-up over the course of the disclosed laser welding by a remote laser welding apparatus.

The laser welding method may be performed on a variety of workpiece stack-up configurations. For example, the disclosed method may be used in conjunction with a "2T" workpiece stack-up (e.g., FIGS. 2-11) that includes two overlapping and adjacent steel workpieces, or it may be used in conjunction with a "3T" workpiece stack-up (e.g., FIGS. 12-17) that includes three overlapping and adjacent steel workpieces. The several steel workpieces included in the workpiece stack-up may have similar or dissimilar strengths and grades, and may have similar or dissimilar thicknesses at the weld site, if desired. The laser welding method is carried out in essentially the same way to achieve the same results regardless of whether the workpiece stack-up includes two or three overlapping steel workpieces. Any differences in workpiece stack-up configurations can be easily accommodated by adjusting the characteristics of the one or more pre-welding laser beams and the welding laser beam to achieve the same end result.

Figures 1, 1A:
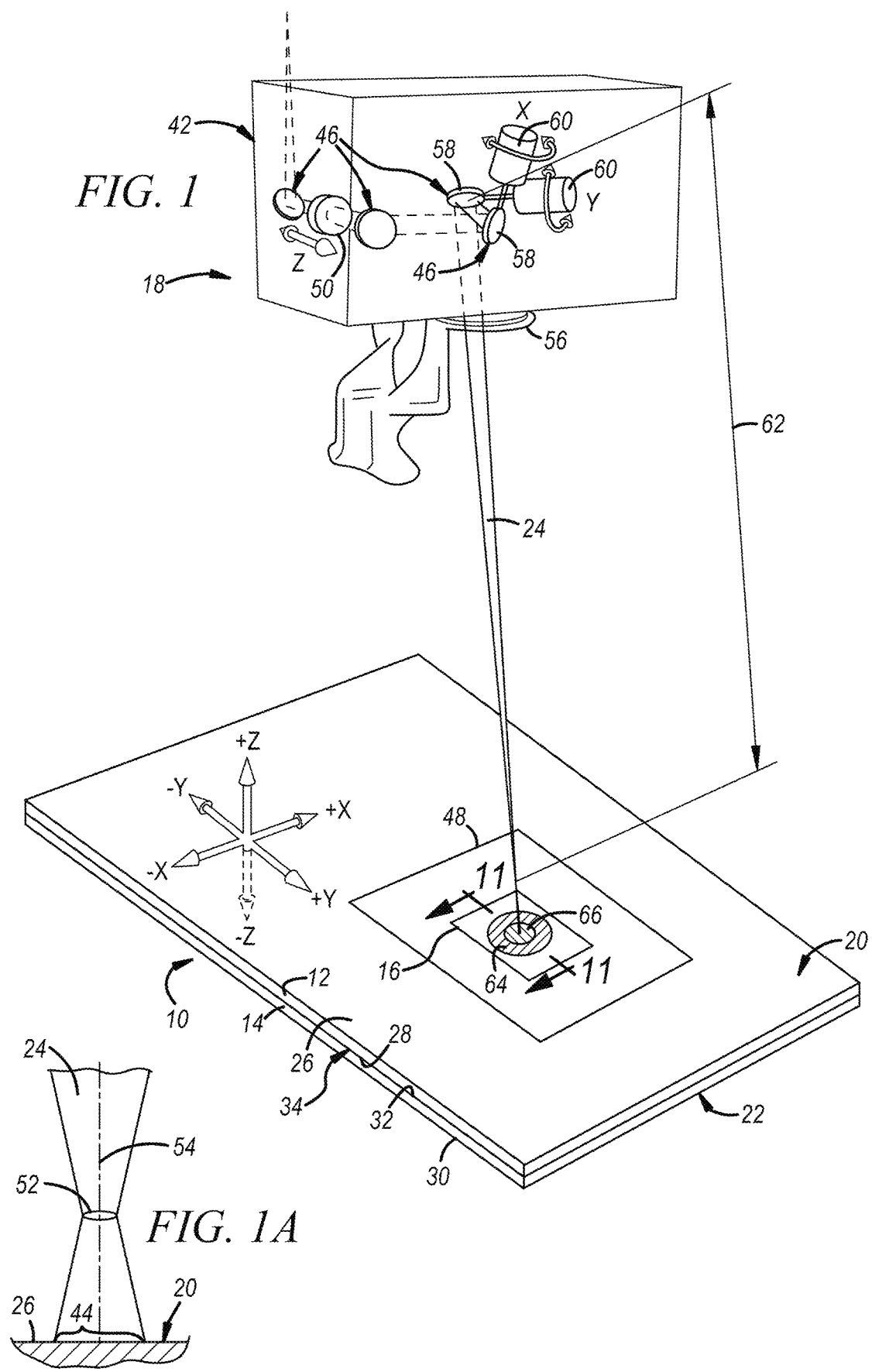
FIG. 1 is a perspective view of an embodiment of a remote laser welding apparatus for heat-treating a region of a workpiece stack-up that includes at least two overlapping steel workpieces followed by forming a laser weld joint located at least partially within the heat-treated region of the stack-up.
FIG. 1A is a magnified view of the general laser beam depicted in FIG. 1 showing a focal point and a longitudinal beam axis of the general laser beam.

Referring now to FIG. 1, a method of laser welding a workpiece stack-up 10 is shown in which the stack-up 10 includes at least a first steel workpiece 12 and a second steel workpiece 14 that overlap at a weld site 16 where the disclosed laser welding method is conducted using a remote laser welding apparatus 18. The first and second steel workpieces 12, 14 provide a top surface 20 and a bottom surface 22, respectively, of the workpiece stack-up 10. The top surface 20 of the workpiece stack-up 10 is made available to the remote laser welding apparatus 18 and is accessible by a laser beam 24 emanating from the remote laser welding apparatus 18. And since only single side access is needed to conduct laser welding, there is no need for the bottom surface 22 of the workpiece stack-up 10 to be made accessible in the same way. The terms "top surface" and "bottom surface" are thus relative designations that identify the surface of the stack-up 10 facing the remote laser welding apparatus 18 (top surface) and the surface of the stack-up 10 facing in the opposite direction. Moreover, while only one weld site 16 is depicted in the Figures for the sake of simplicity, skilled artisans will appreciate that laser welding in accordance with the disclosed method can be practiced at multiple different weld sites spread throughout the same workpiece stack-up.

The workpiece stack-up 10 may include only the first and second steel workpieces 12, 14, as shown in FIGS. 2-11. Under these circumstances, and as shown best in FIGS. 2, 9, and 11, the first steel workpiece 12 includes an exterior outer surface 26 and a first faying surface 28, and the second steel workpiece 14 includes an exterior outer surface 30 and a second faying surface 32. The exterior outer surface 26 of the first steel workpiece 12 provides the top surface 20 of the workpiece stack-up 10 and the exterior outer surface 30 of the second steel workpiece 14 provides the oppositely-facing bottom surface 22 of the stack-up 10. And, since the two steel workpieces 12, 14 are the only workpieces present in the workpiece stack-up 10, the first and second faying surfaces 28, 32 of the first and second steel workpieces 12, 14 overlap and confront to establish a faying interface 34 that extends through the weld site 16. In other embodiments, one of which is described below in connection with FIGS. 12-17, the workpiece stack-up 10 may include an additional third steel workpiece disposed between the first and second steel workpieces 12, 14 to provide the stack-up 10 with three steel workpieces instead of two.

The term "faying interface" is used broadly in the present disclosure and is intended to encompass a wide range of overlapping relationships between the confronting first and second faying surfaces 28, 32 that can accommodate the practice of laser welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer such as a structural adhesive—and thus do not experience the type of interfacial abutment that typifies direct contact—yet are in close enough proximity that laser spot welding can be practiced. As another example, the faying surfaces 28, 32 may establish the faying interface 34 by being separated by gaps that are purposefully imposed. Such gaps may be imposed between the faying surfaces 28, 32 by creating protruding features on one or both of the faying surfaces 28, 32 through laser scoring, mechanical dimpling, or otherwise. The protruding features maintain intermittent contact points between the faying surfaces 28, 32 that keep the surfaces 28, 32 spaced apart outside of and around the contact points by up to 1.0 mm and, preferably, between 0.2 mm and 0.8 mm.

Figure 2:
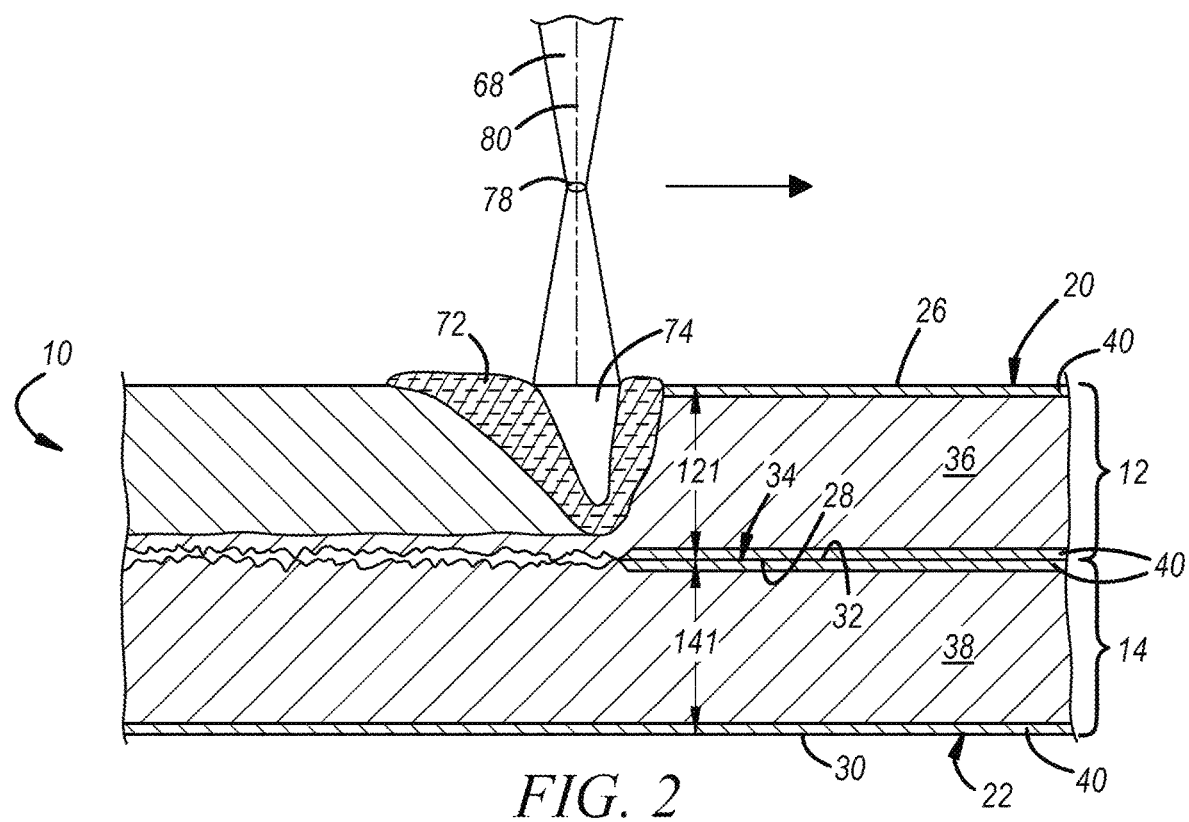
FIG. 2 is a cross-sectional view of an embodiment of the workpiece stack-up, which includes only a first steel workpiece and a second steel workpiece, during heat treating of a region of the stack-up with a pre-welding laser beam, wherein the pre-welding laser beam is directed at a top surface of the workpiece stack-up to create a preliminary molten steel pool that partially penetrates into the first steel workpiece of the workpiece stack-up.

Referring now to FIG. 2, the first steel workpiece 12 includes a first base steel substrate 36 and the second steel workpiece 14 includes a second base steel substrate 38. Each of the base steel substrates 36, 38 may be separately composed of any of a wide variety of steels including a low carbon steel (also commonly referred to as mild steel), interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 12, 14 includes press-hardened steel (PHS). Moreover, each of the first and second base steel substrates 36, 38 may be treated to obtain a particular set of mechanical properties, including being subjected to heat-treatment processes such as annealing, quenching, and/or tempering. The first and second steel workpieces 12, 14 may be hot or cold rolled to their final thicknesses and may be pre-fabricated to have a particular profile suitable for assembly into the workpiece stack-up 10.

At least one of the first or second steel workpieces 12, 14—and in some instances both—includes a surface coating 40 that overlies the base steel substrate 36, 38. As shown here in FIG. 2, each of the first and second base steel substrates 36, 38 is coated with a surface coating 40 that, in turn, provides the steel workpieces 12, 14 with their respective exterior outer surfaces 26, 30 and their respective faying surfaces 28, 32. In another embodiment, only the first base steel substrate is coated with a surface coating 40, and the second base steel substrate is uncoated or bare. Under these circumstances, the surface coating 40 covering the first base steel substrate 36 provides the first steel workpiece 12 with its exterior outer and faying surfaces 26, 28, while the second base steel substrate 38 provides the second steel workpiece 14 with its exterior outer and faying surfaces 30, 32. In yet another embodiment, only the second base steel substrate is coated with a surface coating 40, and the first base steel substrate is uncoated or bare. Consequently, in this case, the first base steel substrate 36 provides the first steel workpiece 12 with its exterior outer and faying surfaces 26, 28, while the surface coating 40 covering the second base steel substrate 38 provides the second steel workpiece 14 with its exterior outer and faying surfaces 30, 32.

The surface coating 40 applied to one or both of the base steel substrates 36, 38 is a zinc-based material. Some examples of a zinc-based material include zinc or a zinc alloy. One particularly preferred alloy that may be employed is a zinc-iron alloy having a bulk average composition that includes 8 wt % to 12 wt % iron and 0.5 wt % to 4 wt % aluminum with the balance (in wt %) being zinc. Each of the coating(s) of a zinc-based material may be applied by hot-dip galvanizing (hot-dip galvanized zinc coating), electrogalvanizing (electrogalvanized zinc coating), or galvannealing (galvanneal zinc-iron alloy coating), typically to a thickness of between 2 μm and 50 μm, although other coating procedures and thicknesses of the attained coating(s) may be employed. Taking into the account the thickness of the base steel substrates 36, 38 and their optional surface coatings 40, each of a thickness 121 of the first steel workpiece 12 and a thickness 141 of the second steel workpiece 14 preferably ranges from 0.4 mm to 4.0 mm and, more narrowly, from 0.5 mm to 2.5 mm, at least at the weld site 16. The thicknesses 121, 141 of the first and second steel workpieces 12, 14 may be the same of different from each other.

Referring back to FIG. 1, the remote laser welding apparatus 18 includes a scanning optic laser head 42. The scanning optic laser head 42 directs the laser beam 24 at the top surface 20 of the workpiece stack-up 10 which, here, is provided by the exterior outer surface 26 of the first steel workpiece 12. The directed laser beam 24 impinges the top surface 20 and has a beam spot 44 (FIG. 1A), which is the sectional area of the laser beam 24 at a plane oriented along the top surface 20 of the stack-up 10. The scanning optic laser head 42 is preferably mounted to a robotic arm (not shown) that can quickly and accurately carry the laser head 42 to many different preselected weld sites 16 on the workpiece stack-up 10 in rapid programmed succession. The laser beam 24 used in conjunction with the scanning optic laser head 42 is preferably a solid-state laser beam operating with a wavelength in the near-infrared range (commonly considered to be 700 nm to 1400 nm) of the electromagnetic spectrum. Additionally, the laser beam 24 has a power level capability that can attain a power density sufficient to melt the steel workpieces 12, 14 and, if desired, to vaporize the steel workpieces 12, 14 beneath the beam spot 44 to produce a keyhole. The power density needed to produce a keyhole within the overlapping steel workpieces 12, 14 is typically in the range of 0.5-1.5 MW/cm$^2$.

Some examples of a suitable solid-state laser beam that may be used in conjunction with the remote laser welding apparatus 18 include a fiber laser beam, a disk laser beam, and a direct diode laser beam. A preferred fiber laser beam is a diode-pumped laser beam in which the laser gain medium is an optical fiber doped with a rare earth element (e.g., erbium, ytterbium, neodymium, dysprosium, praseodymium, thulium, etc.). A preferred disk laser beam is a diode-pumped laser beam in which the gain medium is a thin laser crystal disk doped with a rare earth element (e.g., a ytterbium-doped yttrium-aluminum garnet (Yb:YAG) crystal coated with a reflective surface) and mounted to a heat sink. And a preferred direct diode laser beam is a combined laser beam (e.g., wavelength combined) derived from multiple diodes in which the gain medium is multiple semiconductors such as those based on aluminum gallium arsenide (AlGaAS) or indium gallium arsenide (InGaAS). Laser generators that can generate each of those types of lasers as well as other variations are commercially available. Other solid-state laser beams not specifically mentioned here may of course be used.

The scanning optic laser head 42 includes an arrangement of mirrors 46 that can maneuver the laser beam 24, and thus convey the beam spot 44, along the top surface 20 of the workpiece stack-up 10 within an operating envelope 48 that encompasses the weld site 16. Here, as illustrated in FIG. 1, the portion of the top surface 20 spanned by the operating envelope 48 is labeled the x-y plane since the position of the laser beam 24 within the plane is identified by the "x" and "y" coordinates of a three-dimensional coordinate system. In addition to the arrangement of mirrors 46, the scanning optic laser head 42 also includes a z-axis focal lens 50, which can move a focal point 52 (FIG. 1A) of the laser beam 24 along a longitudinal axis 54 of the laser beam 24 to thus vary the location of the focal point 52 in a z-direction that is oriented perpendicular to the x-y plane in the three-dimensional coordinate system established in FIG. 1. Furthermore, to keep dirt and debris from adversely affecting the optical system components and the integrity of the laser beam 24, a cover slide 56 may be situated below the scanning optic laser head 42. The cover slide 56 protects the arrangement of mirrors 46 and the z-axis focal lens 50 from the surrounding environment yet allows the laser beam 24 to pass out of the scanning optic laser head 42 without substantial disruption.

The arrangement of mirrors 46 and the z-axis focal lens 50 cooperate during operation of the remote laser welding apparatus 18 to dictate the desired movement of the laser beam 24 and its beam spot 44 within the operating envelope 48 at the weld site 16 as well as the position of the focal point 52 along the longitudinal axis 54 of the beam 24. The arrangement of mirrors 46, more specifically, includes a pair of tiltable scanning mirrors 58. Each of the tiltable scanning mirrors 58 is mounted on a galvanometer 60. The two tiltable scanning mirrors 58 can move the location of the beam spot 44—and thus change the point at which the laser beam 24 impinges the top surface 20 of the workpiece stack-up 10—anywhere in the x-y plane of the operating envelope 48 through precise coordinated tilting movements executed by the galvanometers 60. At the same time, the z-axis focal lens 50 controls the location of the focal point 52 of the laser beam 24 in order to help administer the laser beam 24 at the correct power density. All of these optical components 50, 58 can be rapidly indexed in a matter of milliseconds or less to advance the laser beam 24 relative to the x-y plane of the top surface 20 of the workpiece stack-up 10 along a beam travel pattern of simple or complex geometry while controlling the location of the focal point 52.

A characteristic that differentiates remote laser welding from other conventional forms of laser welding is the focal length of the laser beam 24. Here, as shown in best in FIG. 1, the laser beam 24 has a focal length 62, which is measured as the distance between the focal point 52 and the last tiltable scanning mirror 58 that intercepts and reflects the laser beam 24 prior to the laser beam 24 impinging the top surface 20 of the workpiece stack-up 10 (also the exterior outer surface 26 of the first steel workpiece 12). The focal length 62 of the laser beam 24 is preferably in the range of 0.4 meters to 2.0 meters with a diameter of the focal point 52 typically ranging anywhere from 350 μm to 700 μm although larger and smaller focal point diameter values are certainly possible. The scanning optic laser head 42 shown generally in FIG. 1 and described above, as well as others that may be constructed somewhat differently, are commercially available from a variety of sources. Some notable suppliers of scanning optic laser heads and lasers for use with the remote laser welding apparatus 18 include HIGHYAG (Kleinmachnow, Germany) and TRUMPF Inc. (Farmington, Conn., USA).

In the presently disclosed laser welding method, and referring now to FIGS. 1-11, a region 64 of the workpiece stack-up 10 (also referred to as the "heat-treated region") is first heat-treated to remove vaporizable zinc in preparation for the subsequent formation of a laser weld joint 66, which is located at least partially within the heat-treated region 64, that autogenously fusion welds the steel workpieces 12, 14 together at the weld site 16. Both the heat treatment of the workpiece stack-up 10 and the formation of the laser weld joint 66 can be carried out using the remote laser welding apparatus 18. In particular, during heat-treating, the laser beam 24 transmitted by the remote laser welding apparatus 18 may be purposed as a pre-welding laser beam and advanced relative to a plane (i.e., the x-y plane) of the top surface of the workpiece stack-up 10 along a pre-welding beam travel pattern. This action may be performed one or more times to achieve the heat-treated region 64. Then, following heat-treating, the laser beam 24 may be purposed as a welding laser beam and advanced relative to the plane (also the x-y plane) of the top surface of the workpiece stack-up 10 along a welding beam travel pattern to form the laser weld joint 66. The pre-welding laser beam(s) and the welding laser beam may differ from each other in one or more of their beam characteristics (e.g., power level, travel speed, focal position) in order to control the heat input and the extent and depth of melting of the stack-up 10 as needed to perform their intended functions.

Figure 3:
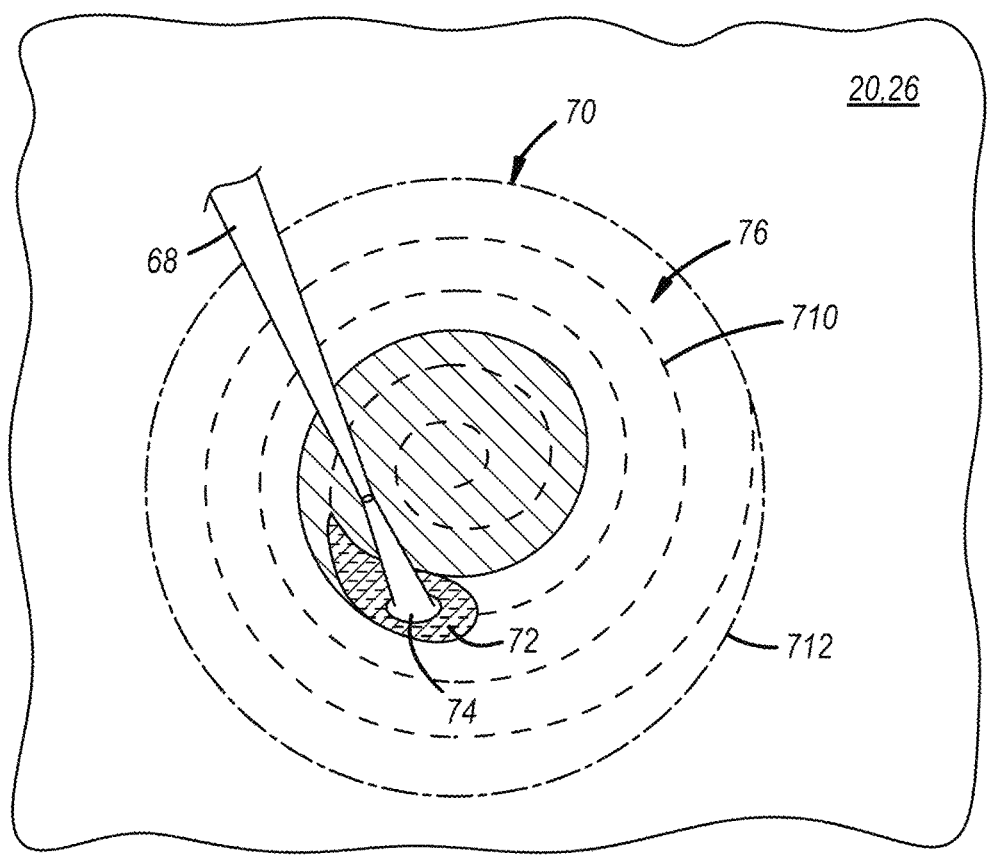
FIG. 3 is a plan view of the embodiment of the workpiece stack-up shown in FIG. 2 and illustrates advancement of the pre-welding laser beam relative to a plane of the top surface of the stack-up along one particular implementation of a pre-welding beam travel pattern.

With reference now to FIGS. 2-3, the heat-treated region 64 is fashioned in the workpiece stack-up 10 by maneuvering a pre-welding laser beam 68 relative to the plane of the top surface 20 of the stack-up 10 along a pre-welding beam travel pattern 70. Such an activity involves directing the pre-welding laser beam 68 at the top surface 20 of the workpiece stack-up 10 so that the laser beam 68 impinges the top surface 20 and creates a preliminary molten steel pool 72 within the stack-up 10. The preliminary molten steel pool 72 penetrates into the first steel workpiece 12 but does not traverse the faying interface 34 of the first and second steel workpieces 12, 14 and extend into the second steel workpiece 14. More specifically, the preliminary molten steel pool 72 preferably extends from the top surface 20 of the stack-up 10 to a depth that exceeds 50%, or more preferably at least 75%, of the thickness 121 of the first steel workpiece 12. The creation of the preliminary molten steel pool 72 may optionally be accompanied by a keyhole 74 within and surrounded by the molten steel pool 72 depending on the elected power density of the pre-welding laser beam 68. The keyhole 74 is shown here in FIG. 2 but is not necessarily present in every application of the heat-treatment stage as the preliminary molten steel pool 72 may be obtained through heat conduction in the absence of steel vaporization.

After creation of the preliminary molten steel pool 72, the pre-welding laser beam 68 is advanced—and its beam spot is conveyed—relative to the plane of the top surface 20 of the workpiece stack-up 10 along the pre-welding beam travel pattern 70 while maintaining the partial penetration of the preliminary molten steel pool 72 into the first steel workpiece 12. Such advancement of the pre-welding laser beam 68 is managed by precisely and rapidly coordinating the tilting movements of the tiltable scanning mirrors 58 within the scanning optic laser head 42 to effectuate the desired patterned movement of the laser beam 68 along the x-y plane of the top surface 20. The pre-welding beam travel pattern 70 traced by the pre-welding laser beam 68 has a coverage area 76 on the top surface 20 of the workpiece stack-up 10 that corresponds to the area within which the laser beam 68 is advanced. The coverage area 76 of the pre-welding beam travel pattern 70 may range from 12 $mm^2$ to 115 $mm^2$ or, more narrowly, from 28 $mm^2$ to 65 $mm^2$, regardless of the geometric profile of the pattern 70. Several exemplary beam travel patterns that may be employed as the pre-welding beam travel pattern 70 are described in more detail below.

To arrive at and maintain the desired depth of penetration of the pre-welding laser beam 68 during its advancement along the pre-welding beam travel pattern 70, certain characteristics of the laser beam 68 may be set in a combination that provides the appropriate instantaneous heat input into the workpiece stack-up 10. The pre-welding beam travel pattern 70 and the characteristics of the pre-welding laser beam 68 are controlled by laser welding control software and equipment in accordance with programmed instructions. For example, during heat treating, the pre-welding laser beam 68 may have a power level that ranges from 0.5 kW to 10 kW and may be advanced along the pre-welding beam travel pattern 70 at a travel speed that ranges from 1.5 m/min to 20 m/min while a focal position of the laser beam 68 is defocused and positioned between +10 mm and +100 mm. The term "focal position" as used herein refers to the distance between a focal point 78 of the pre-welding laser beam 68 and the top surface 20 of the workpiece stack-up 10 along a longitudinal axis 80 of the beam 68. The focal position of the pre-welding laser beam 68 is thus zero when the focal point 78 is positioned at the top surface 20 of the stack-up 10. Likewise, the focal position is a positive value (+) when the focal point 78 is positioned above the top surface 20 and a negative value (−) when positioned below the top surface 20.

The programmed pre-welding beam travel pattern 70 traced by the pre-welding laser beam 68 may assume a variety of different profiles, as previously mentioned. Several specific examples of pre-welding beam travel patterns are shown in FIGS. 3-8, which are plan views, from above, of the various pre-welding beam travel patterns 70 as projected onto the top surface 20 of the workpiece stack-up 10 along with their corresponding coverage areas 76. Each of those exemplary pre-welding beam travel patterns 70 is configured to continuously impose multidirectional movement of the pre-welding laser beam 68 along the plane of the top surface 20 of the workpiece stack-up 10 and, consequently, to translate the preliminary molten steel pool 72 along a corresponding route within the workpiece stack-up 10. As such, each of the illustrated pre-welding beam travel patterns 70 includes one or more nonlinear weld paths, which may be continuously curved, contain linear segments connected end-to-end at angles to contribute to an overall weld path that deviates from strict linearity, or some combination of the two. Other geometric profiles may of course be implemented as the pre-welding beam travel pattern 70 for the purpose of fashioning the heat-treated region 64 within the workpiece stack-up 10 despite the fact that those additionally-contemplated patterns are not explicitly shown in the Figures.

Figure 4:
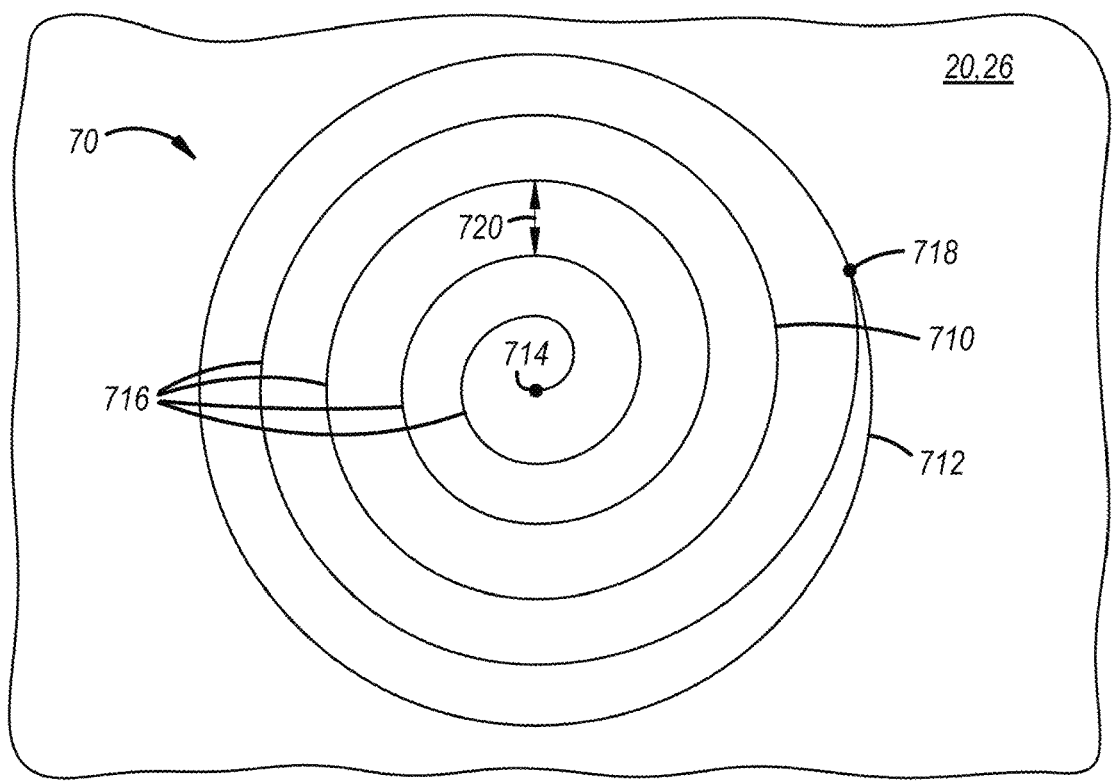
FIG. 4 depicts one embodiment of a pre-welding beam travel pattern along which the pre-welding laser beam may be advanced relative to a plane of the top surface of the workpiece stack-up.

Referring now to FIGS. 3-4, the pre-welding beam travel pattern 70 may include a spiral weld path 710 and, optionally, an outer peripheral circular weld path 712 that surrounds the spiral weld path 710. This particular pre-welding beam travel pattern 70 is shown in FIG. 3 as an example practice of the disclosed laser welding method while FIG. 4 includes more details regarding its geometric profile. As shown best in FIG. 4, the spiral weld path encircles and revolves around an innermost point 714 to produce a plurality of turnings 716 that expands radially between the innermost point 714 and an outermost point 718. Anywhere from one to ten turnings 716 may be present. The single spiral weld path 710 may be continuously curved, as shown in FIGS. 3-4, and may further be arranged into an Archimedean spiral in which the turnings 716 of the weld path 710 are spaced equidistantly from each other by a step distance 720 that preferably ranges from 0.5 mm to 3 mm as measured between radially-aligned points on each pair of adjacent turnings 716. The spiral weld path 710 may transition into the outer peripheral circular weld path 712 at the outermost point 718, as shown, or the two weld paths 710, 712 may be distinct from one another. In one particularly preferred embodiment, the spiral weld path 710 is an Archimedean spiral having three to six turnings and is surrounded by a an outer peripheral circular weld path 712 having a diameter that lies between 5 mm to 10 mm.

Figure 5:
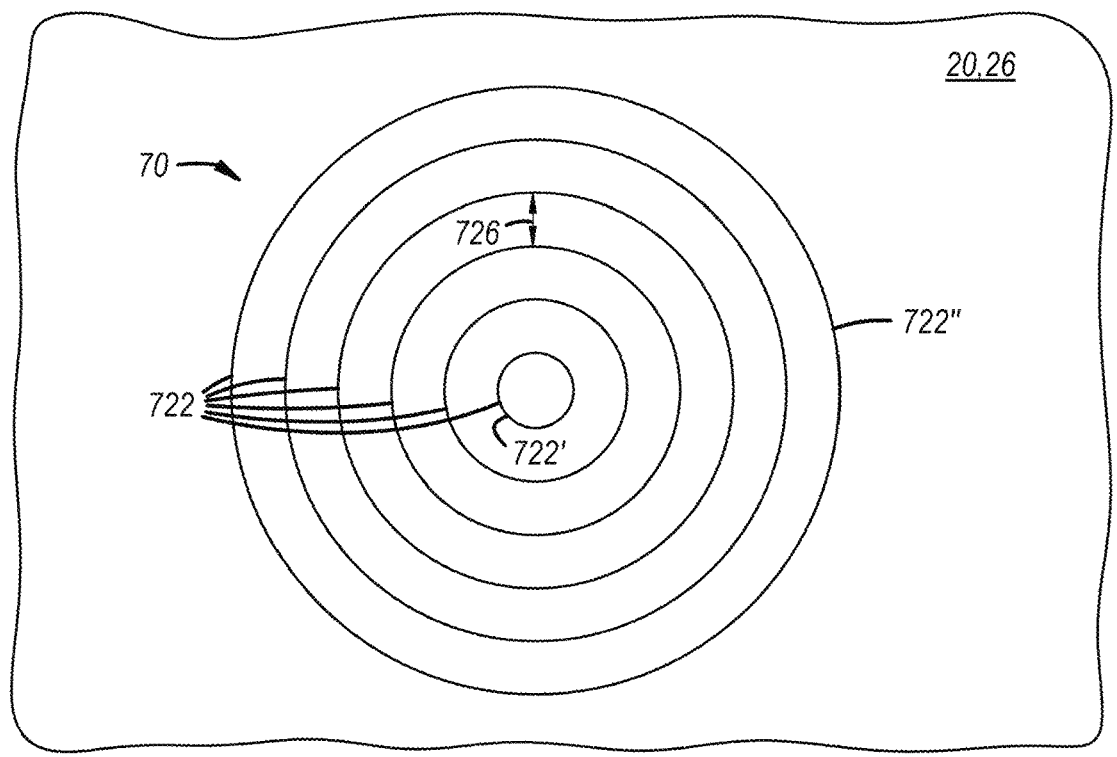
FIG. 5 depicts another embodiment of a pre-welding beam travel pattern along which the pre-welding laser beam may be advanced relative to a plane of the top surface of the workpiece stack-up.
Figure 6:
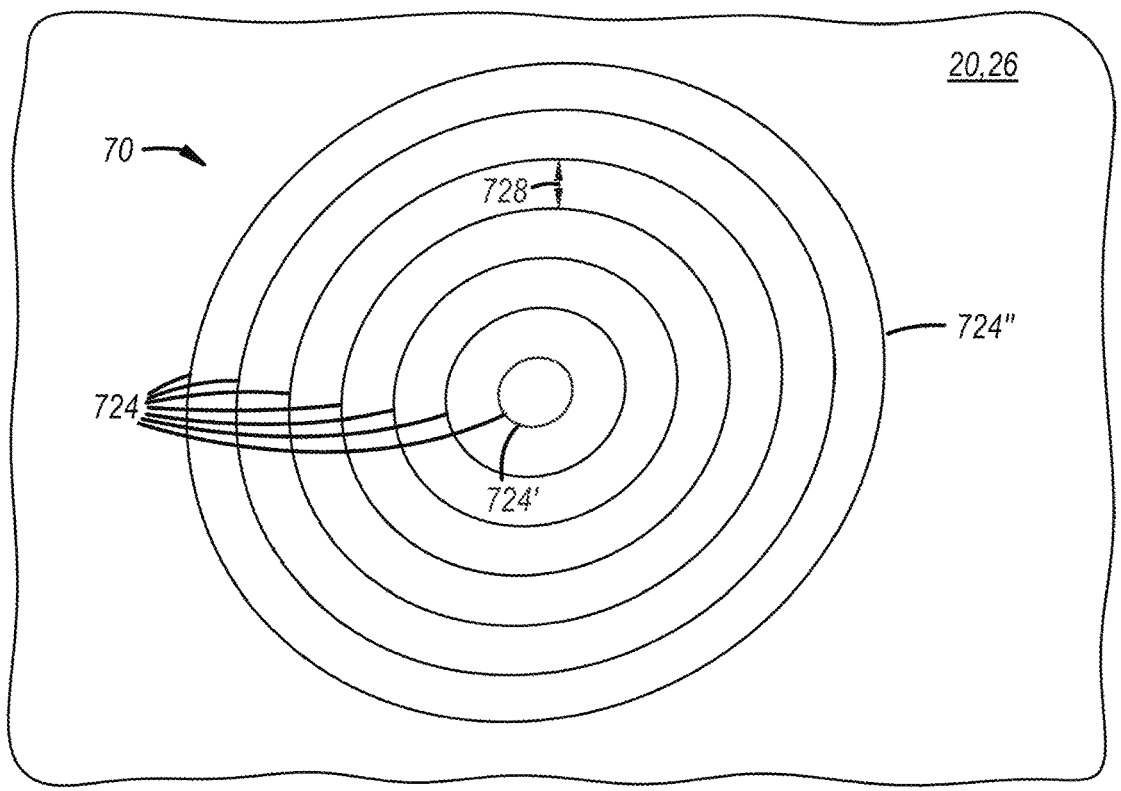
FIG. 6 depicts yet another embodiment of a pre-welding beam travel pattern along which the pre-welding laser beam may be advanced relative to a plane of the top surface of the workpiece stack-up.

FIGS. 5-6 illustrate other alternative embodiments of the pre-welding beam travel pattern 70 that comprise one or more separate and distinct weld paths. In FIG. 5, for example, the pre-welding beam travel pattern 70 includes a plurality of unconnected circular weld paths 722 that are radially-spaced apart on the top surface 20 of the workpiece stack-up 10 and concentrically arranged around a common midpoint. The discrete circular weld paths 722 may be radially-spaced evenly apart or they may be spaced at varying distances between an innermost circular weld path 722' and an outermost circular weld path 722". As another example, and referring now to FIG. 6, the pre-welding beam travel pattern 70 may include a plurality of unconnected elliptical weld paths 724 in lieu of the circular weld paths 722 depicted in FIG. 5. The discrete elliptical weld paths 724 may be spaced apart between an innermost elliptical weld path 724' and an outermost circular weld path 724" in the same manner as the circular weld paths 722 of FIG. 5. Anywhere from two to ten circular/elliptical weld paths 722, 724 may be present in their respective pre-welding beam travel patterns 70. And, like the spiral weld path 710 depicted in FIGS. 3-4, a distance 726, 728 between radially-aligned points on each pair of adjacent circular/elliptical weld paths 722, 724 (or step distance) preferably ranges from 0.5 mm to 3 mm. In a particularly preferred embodiment, the patterns in FIGS. 5 and 6 include between three and six equally radially-spaced apart circular/elliptical weld paths 722, 724 with the outermost weld path 722", 724" having a diameter that lies between 5 mm to 10 mm.

Still further, in an embodiment related to the embodiments shown in FIGS. 5-6, the pre-welding beam travel pattern 70 may include only a single one of the circular or elliptical weld paths 722, 744. The diameter of the single circular/elliptical weld path 722, 724 may be selected along with appropriately defocused focal position of the pre-welding laser beam 68 in order to ensure that the beam spot 44 covers enough area on the top surface 20 of the workpiece stack-up 10 to fashion the heat-treated region 64. For instance, in a preferred implementation, the single circular/elliptical weld path 722, 724 may have a diameter between 5 mm and 6 mm or, more narrowly between 5.2 mm and 5.8 mm, and the focal position of the pre-welding laser beam 68 may be defocused to between +90 and +100 mm. The single circular/elliptical weld path embodiment of the pre-welding beam travel pattern 70 shown in FIGS. 5-6 may be employed in a variety of circumstances including, for example, when both of the first and second steel workpieces 12, 14 are relatively thin or when the geometric simplicity is desired in the pre-welding beam travel pattern 70, among others.

Figure 7:
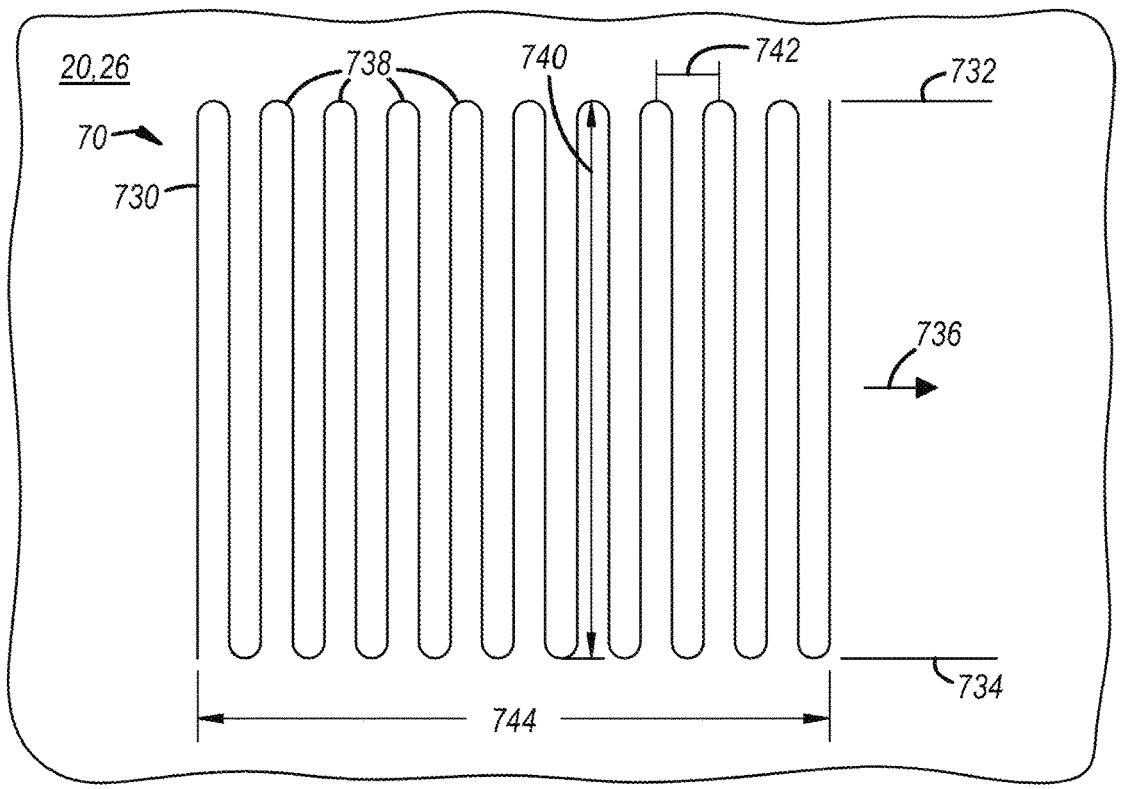
FIG. 7 depicts still another embodiment of a pre-welding beam travel pattern along which the pre-welding laser beam may be advanced relative to a plane of the top surface of the workpiece stack-up.

Another embodiment of the pre-welding beam travel pattern 70 is illustrated in FIG. 7. There, as shown, the beam travel pattern 70 includes a single continuous waveform weld path 730 that oscillates between a first pattern boundary 732 and an opposed second pattern boundary 734 while moving in an overall direction 736 transverse to the oscillation direction of the waveform weld path 730. As such, the single continuous waveform weld path 730 may include anywhere from three to ten periodic runs 738, with each run 738 equating to a single period of the recurring waveform weld path 730. The runs 738 may be defined by amplitudes (peak-to-peak) 740 that range from 5 mm to 10 mm and wavelengths 742 that range from 2 mm to 4 mm. Additionally, the single continuous waveform weld path 730 may have a length 744 measured in the direction 736 transverse to the oscillation direction of the waveform weld path 730—i.e., the length is measured perpendicular to the amplitudes 740 of the periodic runs 738—that ranges from 5 mm to 10 mm.

Figure 8:
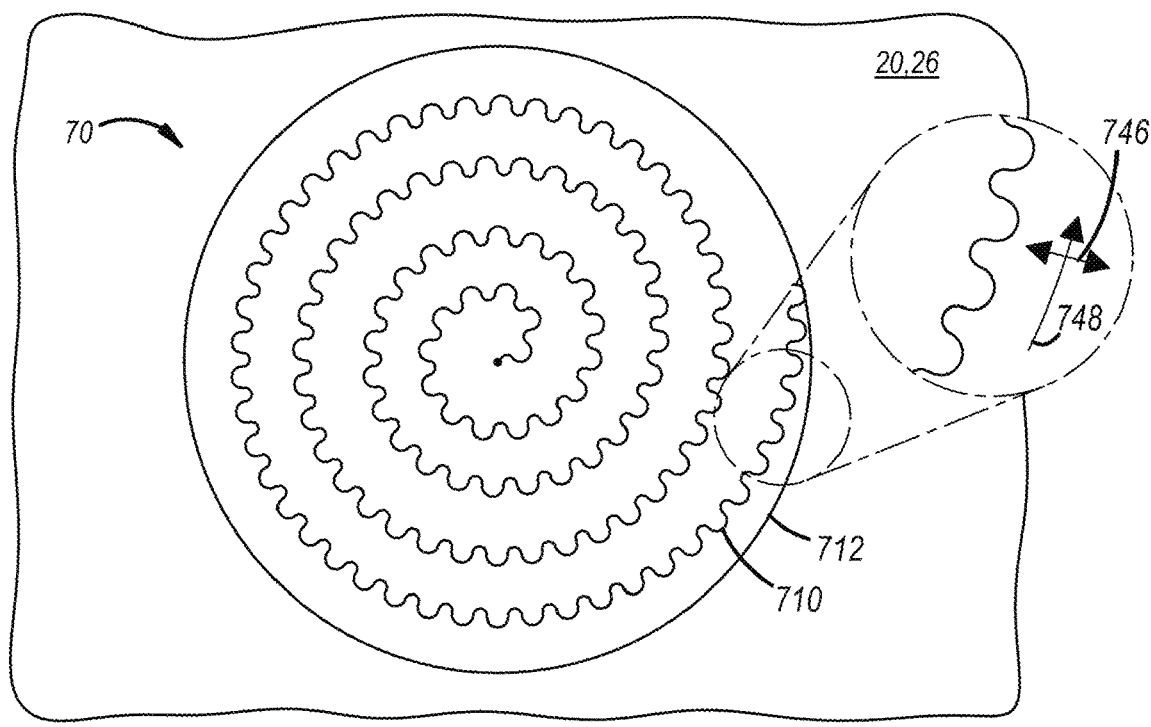
FIG. 8 depicts yet another embodiment of a pre-welding beam travel pattern along which the pre-welding laser beam may be advanced relative to a plane of the top surface of the workpiece stack-up.

In still other embodiments of the pre-welding beam travel pattern 70, as depicted in FIG. 8, the pre-welding laser beam 68 may be advanced along any of the spiral weld path 710 (FIGS. 3-4), the one or more of the circular weld paths 722 (FIG. 5), or the one or more of the elliptical weld paths 724 (FIG. 6), plus others not shown, while oscillating back and forth in a lateral direction 746 oriented transverse to a mean forward direction 748 of the laser beam 68. The oscillating movement of the pre-welding laser beam 68 as applied to the spiral weld path 710 is shown here for demonstrative purposes and can be similarly incorporated into the circular/elliptical weld paths 724, 726. The back-and-forth oscillations of the pre-welding laser beam 68 may be sinusoidal, as shown, but can also be zig-zag or rectangular or some other shape. In terms of the size and spacing of the back-and-forth oscillations, both the peak-to-peak amplitude and the wavelength of the lateral deviations of the pre-welding laser beam 68 preferably range from 0.1 mm to 6.0 mm as the laser beam 68 is moving in the mean forward direction 748 along the designated weld path 710, 722, 724.

When the pre-welding laser beam 68 is advanced along the pre-welding beam travel pattern 70, including any of the patterns shown in FIGS. 3-8, as well as others not shown, the translation of the preliminary molten steel pool 72 along a corresponding route within the workpiece stack-up 10 establishes the heat-treated region 64. As shown best in FIG. 11—which depicts the workpiece stack-up 10 in cross-section following both heat-treatment and the formation of the laser weld joint 66—the heat-treated region 64 is a three-dimensional penetrating region that extends into the workpiece stack-up 10 from the top surface 20. The heat-treated region 64 includes the steel material that has been melted by the pre-welding laser beam 68 and resolidified as well as the surrounding heat-affected zone, and is typically tapered as it extends towards the bottom surface 22 of the workpiece stack-up 10. And, depending on the depth of penetration of the preliminary molten steel pool 72 as well as other factors, including the composition of the steel workpieces 12, 14, the heat-treated region 64 may extend all the way to the bottom surface 22 of the stack-up 10, as shown, or it may extend only partway to the bottom surface 22.

The fashioning of the heat-treated zone 64 with the pre-welding laser beam 68 is accompanied by heating and vaporizing at least one surface coating 40 of a zinc-based material to reduce the amount of vaporizable zinc in the region 64. For instance, if a surface coating 40 is present at the exterior outer surface 26 of the first steel workpiece 12, the advancement of the pre-welding laser beam 68 and the corresponding translation of the upper portion of the preliminary molten steel pool 72 along the exterior outer surface 26 (also the top surface 20 of the workpiece stack-up 10) vaporizes the surface coating 40 and expels released zinc vapors to the surrounding environment. As for the exterior outer surface 30 of the second steel workpiece 14, the heat conducted from the preliminary molten steel pool 72 into the second steel workpiece 14 may be sufficient, in some instances, to vaporize a surface coating 40 at the exterior outer surface 30 (also the bottom surface 22 of the workpiece stack-up 10), if such a surface coating 40 is present, although the quantity of vaporizable zinc that is released at that surface 30 is likely to be less than the quantity that is be released at the exterior outer surface 26 of the first steel workpiece 12.

As another possibility, if a surface coating 40 is present at the first faying surface 28 of the first steel workpiece 12 and/or the second faying surface 32 of the second steel workpiece 14, the heat generated by the pre-welding laser beam 68 within the workpiece stack-up 10 vaporizes the surface coating(s) 40, causing zinc vapors to be released and driven laterally outward along the faying interface 34 due to the relatively high pressure of the released zinc vapors and the absence of a direct diffusion pathway into the preliminary molten steel pool 72. Moreover, if the preliminary molten steel pool 72 penetrates far enough into the first steel workpiece 12, such as to a depth that exceeds at least 75% of the thickness 121 of the steel workpiece 12, the first base steel substrate 36 will be thermally distorted and roughened at the first faying surface 28, which, in turn, induces small and irregular gaps between the first and second faying surfaces 28, 32 at least within the heat-treated region 64. These gaps can enhance and facilitate the lateral outward venting of zinc vapors along the faying interface 34 to the extent that any such vapors are released between the steel workpieces 12, 14.

The removal of vaporizable zinc from the heat-treated region 64 minimizes or even virtually eliminates the amount of zinc vapors produced during the subsequent formation of the laser weld joint 66, which is located at least partially within the heat-treated region 64, thus resulting in less porosity in the subsequently-formed laser the weld joint 66 as well as a lower tendency to produce spatter and blowholes. Such results can be achieved even if the faying surfaces 28, 32 of the steel workpieces 12, 14 are initially in direct flush contact. While the fashioning of the heat-treated region 64, in and of itself, is effective at removing vaporizable zinc, there are some practices that can help enhance the amount of vaporizable zinc actually removed. For one, the pre-welding beam travel pattern 70 can be designed to induce multidirectional movement of the pre-welding laser beam 68 along the top surface of the workpiece stack-up 10, as is the case for the patterns 70 illustrated in FIGS. 3-8. Without being bound by theory, it is currently believed that incorporating multidirectional laser beam movement into the pre-welding beam travel pattern 70 helps support zinc vaporization and zinc vapor venting by constantly provoking changes in the molten fluid velocity field within the workpiece stack-up 10.

Another way to help enhance the amount of vaporizable zinc removed from the heat-treated region 64 is to directionally advance the pre-welding laser beam 68 along the pre-welding beam travel pattern 70 so as to sweep released zinc vapors towards a perimeter of the region 64, especially if zinc vapors are released between the steel workpieces 12, 14 at the faying interface 34. This can be accomplished by progressing the pre-welding laser beam 68 radially outwards along the pre-welding beam travel pattern 70 in the event that the travel pattern 70 includes the spiral weld path 710 or the circular/elliptical weld paths 722, 724 shown in FIGS. 3-4 and 5-6, respectively, or others like them. In this way, and referring back to FIGS. 3-4, the pre-welding laser beam 68 can sweep released vapors towards a perimeter of the heat-treated region 64 by being advanced along the plurality of turnings 716 of the spiral weld path 710 from the innermost point 714 to the outermost point 718. Likewise, and referring back to FIGS. 5-6, the pre-welding laser beam 68 can sweep released vapors towards a perimeter of the heat-treated region 64 by being advanced along the circular/elliptical weld paths 722, 724 in a radially outward progression starting from the innermost circular/elliptical weld path 722', 724' and ending with the outermost circular/elliptical weld path 722", 724".

Other pre-welding beam travel patterns 70 can also support sweeping zinc vapors towards a perimeter of the heat-treated region 64. For example, and referring back to FIG. 7, the advancement of the pre-welding laser beam 68 along the single continuous waveform weld path 730 while moving in the overall direction 736 transverse to the oscillation direction of the waveform weld path 730 has the effect of sweeping released zinc vapors towards a perimeter of the heat-treated region 64. Specifically, the released zinc vapors are primarily swept and cleared in the same direction as the overall direction 736 of the pre-welding laser beam 68 along the waveform weld path 730. The effectiveness of clearing the released zinc vapors in this way may be improved even further by employing greater amplitudes 740 and shorter wavelengths 742 to delineate a plurality of elongated and tightly-spaced periodic runs 738 within the single continuous waveform weld path 730.

Figure 10:
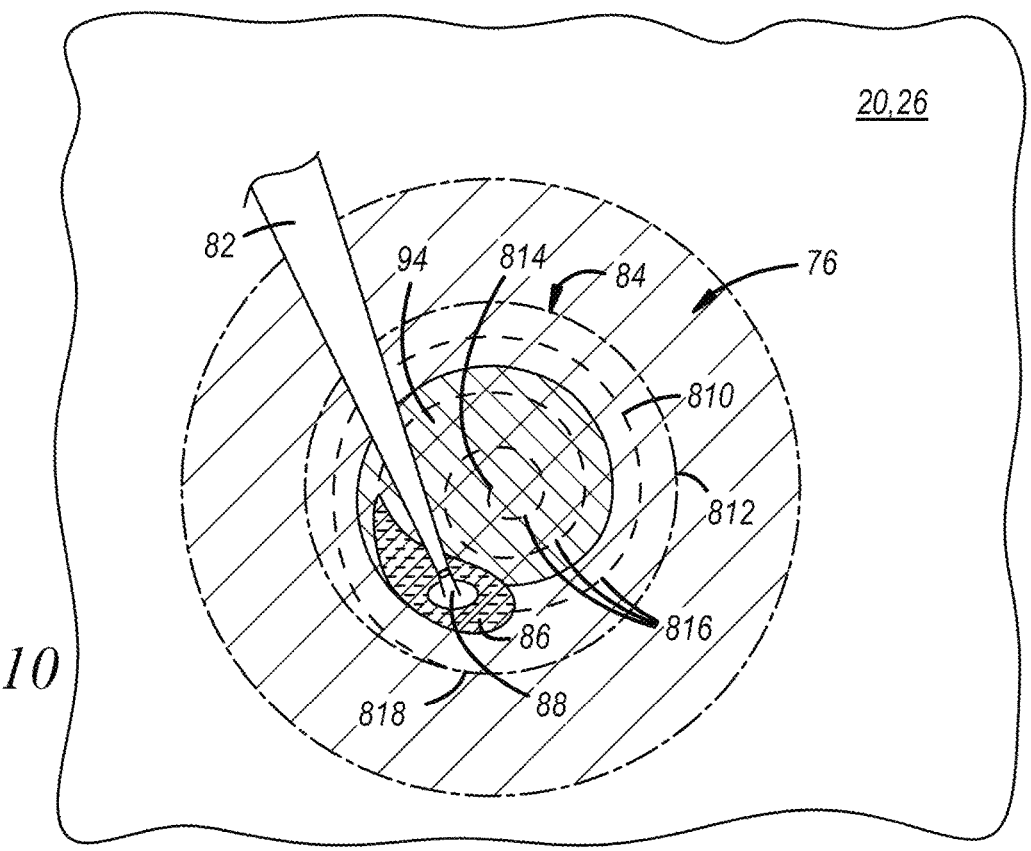
FIG. 10 is a plan view of the embodiment of the workpiece stack-up shown in FIG. 9 and illustrates advancement of the welding laser beam relative to a plane of the top surface of the stack-up along one particular implementation of a welding beam travel pattern that at least partially overlaps with a coverage area of the pre-welding beam travel pattern associated with the pre-welding laser beam.
Figure 9:
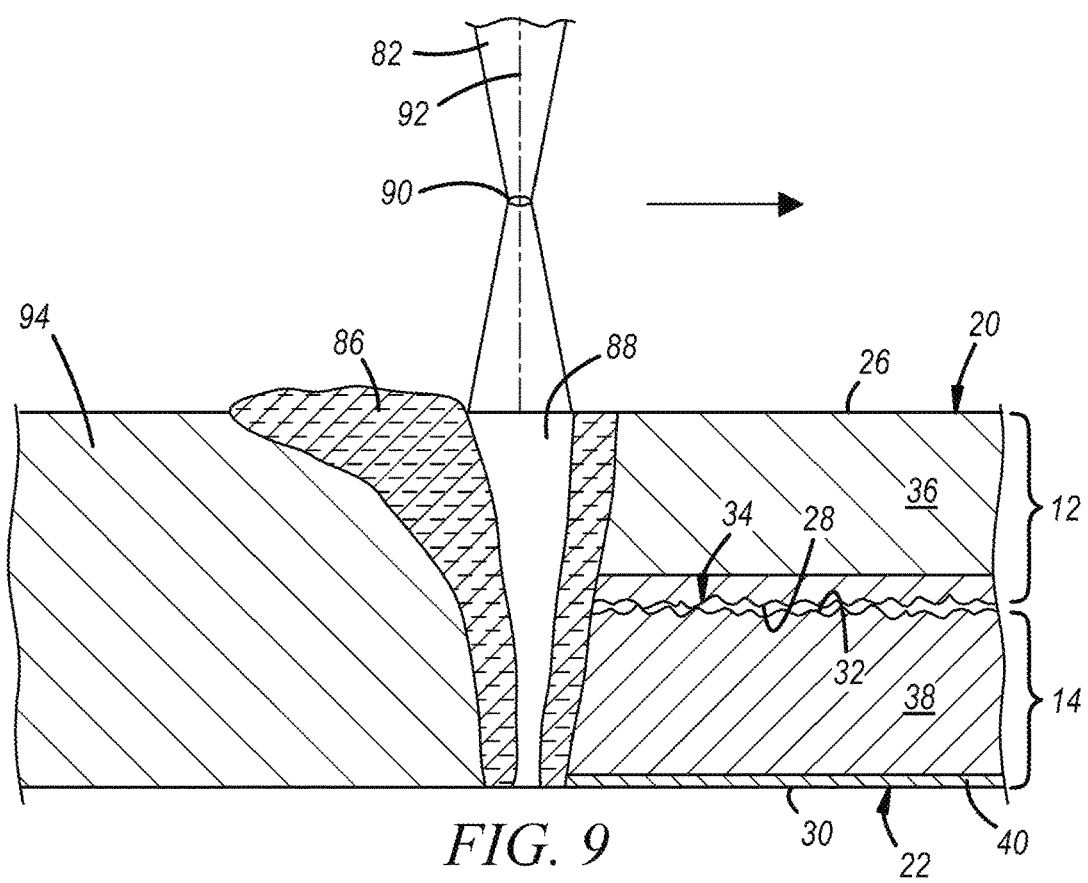
FIG. 9 is a cross-sectional view of the embodiment of the workpiece stack-up shown in FIG. 2 during formation of a laser weld joint with a welding laser beam after the designated region of the stack-up has been heat-treated, wherein the welding laser beam is directed at a top surface of the workpiece stack-up to create a primary molten steel pool that penetrates into the workpiece stack-up and traverses the faying interface established between the first and second steel workpieces at least part of the time during advancement of the welding laser beam along a welding beam travel pattern.

After the pre-welding laser beam 68 has finished tracking the pre-welding beam travel pattern 70, its transmission is ceased and the heat treatment stage of the overall laser welding method is concluded. The laser weld joint 66 may then be formed to autogenously fusion weld the overlapping steel workpieces 12, 14 together. Referring now to FIGS. 9-10, the laser weld joint 66 is formed by maneuvering a welding laser beam 82 along a welding beam travel pattern 84 such that the resultant joint 66 is located at least partially within the heat-treated region 64. Such activity involves directing the welding laser beam 82 at the top surface 20 of the workpiece stack-up 10 so that the laser beam 82 impinges the top surface 20 and creates a primary molten steel pool 86 within the stack-up 10 and, preferably, a keyhole 88 within and surrounded by the primary molten steel pool 86 at least part of the time. The vaporizing action of the first and second steel workpieces 12, 14 that accompanies keyhole formation leads to the primary molten steel pool 86 having a narrow profile in which the depth of the molten steel pool 86 is generally greater than its width at the top surface 20 of the stack-up 10.

Once the primary molten steel pool 86 is created, the welding laser beam 82 is advanced—and its beam spot is conveyed—relative to the plane of the top surface 20 of the workpiece stack-up 10 along the welding beam travel pattern 84, as shown in FIG. 10. The primary molten steel pool 86 and the keyhole 88 penetrate into the workpiece stack-up 10 from the top surface 20 towards the bottom surface 22 and traverse the faying interface 34 of the first and second steel workpieces 12, 14 at least part of the time that the welding laser beam 82 is being advanced along the welding beam travel pattern 84. Such advancement of the welding laser beam 82 along the welding beam travel pattern 84 is managed by precisely and rapidly coordinating the tilting movements of the tiltable scanning mirrors 58 within the scanning optic laser head 42 to effectuate the desired patterned movement of the laser beam 82 along the plane of the top surface 20. While the welding beam travel pattern 84 may constitute a variety of geometric profiles, it preferably contains one or more nonlinear weld paths as implemented, for example, in the patterns illustrated in FIGS. 3-8. In that regard, the welding beam travel pattern 84 may assume any of the geometries shown and described in FIGS. 3-8, and, accordingly, the above descriptions of those beam travel patterns are equally applicable to the welding beam travel pattern 84 as well, with the exception that that the welding beam travel pattern 84 may in some instances cover a smaller area than the pre-welding beam travel pattern 70.

The extent to which the primary molten steel pool 86 and the keyhole 88 penetrate into the workpiece stack-up 10 while traversing the faying interface 34 may vary while still being able to form the laser weld joint 66 as intended. In a one embodiment, the primary molten steel pool 86 and the keyhole 88 fully penetrate the workpiece stack-up 10, meaning that the molten steel pool 86 and the keyhole 88 extend entirely through the stack-up 10 from the top surface 20 to the bottom surface 22, as shown in FIG. 9. In another embodiment, the primary molten steel pool 86 and the keyhole 88 may partially penetrate the workpiece stack-up 10, but still traverse the faying interface 34, meaning that the molten steel pool 86 and the keyhole 88 extend through the first steel workpiece 12 and only partially into the second steel workpiece 14. As a result of fully or partially penetrating the workpiece stack-up 10 as just described during advancement of the welding laser beam 82 along the welding beam travel pattern 84, enough of the first and second steel workpieces 12, 14 is ultimately melted by the welding laser beam 82 to autogenously fusion weld the steel workpieces 12, 14 together.

To achieve and maintain the desired penetration depth of the primary molten steel pool 86 during its advancement along the welding beam travel pattern 84, certain characteristics of the laser beam 82 may be set in a combination that provides the appropriate instantaneous heat input into the workpiece stack-up 10, as before with the pre-welding laser beam 68. For example, the welding laser beam 82 may have a power level that ranges from 2 kW to 10 kW and may be advanced along the welding beam travel pattern 84 at a travel speed that ranges from 2 m/min to 20 m/min or while a focal position of the laser beam 82 is positioned between 0 mm and +30 mm relative to the top surface 20 of the stack-up 10. The term "focal position" refers to the distance between a focal point 90 of the welding laser beam 82 (FIG. 9) and the top surface 20 of the workpiece stack-up 10 along a longitudinal axis 92 of the beam 82 and, like before with the pre-welding laser beam 68, sets the point of zero reference at the top surface 20 with positive values indicating a distance above the top surface 20 and negative values indicating a distance below the top surface 20.

A preferred embodiment of the welding beam travel pattern 84 and the manner in which the welding laser beam 82 is advanced along that pattern 84 is shown and described with reference to FIG. 10. The welding beam travel pattern 84 preferably includes a single spiral weld path 810 surrounded by an outer peripheral circular weld path 812 that surrounds the spiral weld path 810. The spiral weld path 810 encircles and revolves around an innermost point 814 to produce a plurality of turnings 816 that expands radially between the innermost point 814 and an outermost point 818. Anywhere from three to ten turnings 816 may be present. The single spiral weld path 810 may be continuously curved, as shown, and may further be arranged into an Archimedean spiral in which the turnings 816 of the weld path 810 are spaced equidistantly from each other by a step distance 820 that preferably ranges from 0.5 mm to 4 mm as measured between radially-aligned points on each pair of adjacent turnings 816. The spiral weld path 810 may transition into the outer peripheral weld path 812 at the outermost point 818 as shown or the two weld paths 810, 812 may be distinct from one another. In one particularly preferred embodiment, the spiral weld path 810 is an Archimedean spiral having three to six turnings and is surrounded by a an outer peripheral circular weld path having a diameter that lies between 4 mm and 8 mm.

The primary molten steel pool 86 and the keyhole 88 may traverse the faying interface 34 of the first and second steel workpieces 12, 14 while fully or partially penetrating the workpiece stack-up 10 during the time the welding laser beam 82 is being advanced along the spiral weld path 810. The welding laser beam 82 may be advanced from the innermost point 814 to the outermost point 816, or vice versa, and may have a power level ranging from 2 kW to 10 kW and a focal position between 0 mm and +30 mm relative to the top surface 20 while being advanced at a travel speed of 2 m/min to 20 m/min. When the welding laser beam 82 is advanced along the outer peripheral circular weld path 812, which may precede or follow the tracking of the interior spiral weld path 810, the primary molten steel pool 86 may or may not traverse the faying interface 34 and the keyhole 88 may or may not be present. In fact, in an effort to smooth the transition between the laser weld joint 66 and the surrounding portion of the workpiece stack-up 10 and help avoid the occurrence of an undercut weld joint, the welding laser beam 82 may be defocused, the power level or the laser beam 82 may be reduced, and/or the travel speed of the laser beam 82 may be decreased during tracking of the outer peripheral circular weld path 812. For instance, in one particular embodiment, the welding laser beam 82 may have a power level ranging from 3 kW to 5 kW and a focal position between +10 mm and +50 mm relative to the top surface 20 while being advanced along the outer peripheral circular weld path 812 at a travel speed of 5 m/min to 20 m/min.

Figure 11:
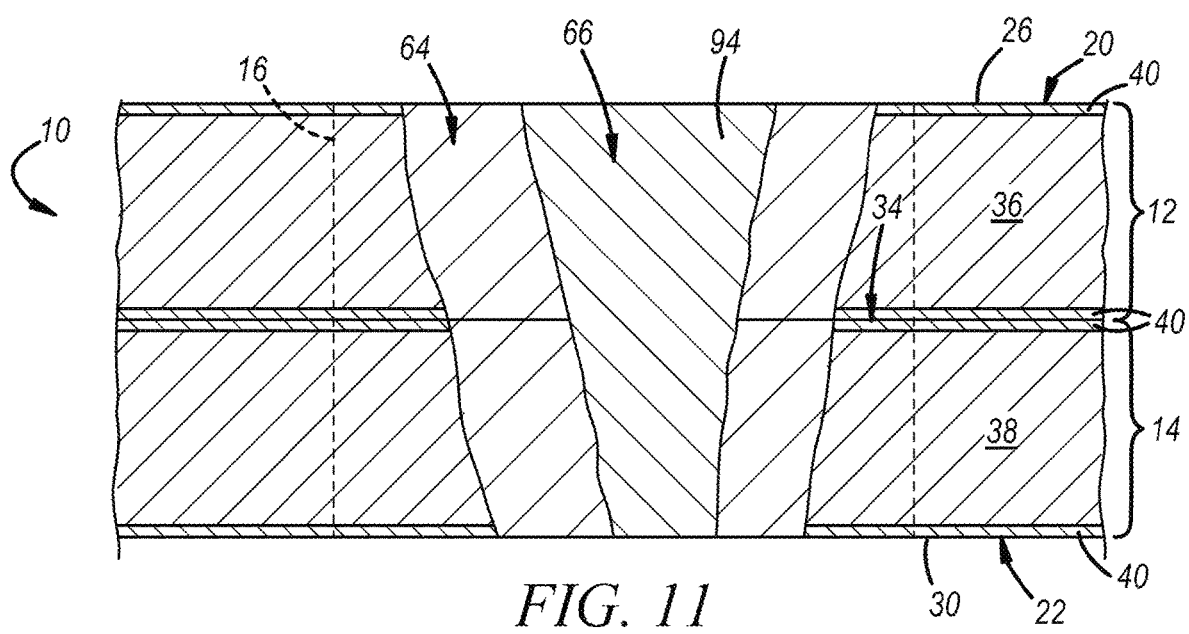
FIG. 11 is a cross-sectional view of the laser weld joint formed by the welding laser beam that depicts the weld joint being fully contained within the heat-treated region of the workpiece stack-up at the top surface of the stack-up.

The advancement of the welding laser beam 82 along the welding beam travel pattern 84 translates the primary molten steel pool 86 along a corresponding route within the workpiece stack-up 10. This causes the penetrating primary molten steel pool 86 to flow around and behind the beam spot of the welding laser beam 82 within the workpiece stack-up 10, resulting in the molten steel pool 86 elongating in the wake of the advancing progression of the welding laser beam 82. The molten steel produced by the advancing laser beam 82 quickly solidifies into resolidified steel workpiece material 94 including a portion that extends from the top surface 20 of the stack-up 10 and across the faying interface 34, preferably all the way to the bottom surface 22 of the stack-up, as shown in FIGS. 9 and 11. And, depending on the geometric profile of the welding beam travel pattern 84, the primary molten steel pool 86 may solidify into a defined trail of resolidified steel workpiece material 94, or it may merge and grow into a larger melt puddle that solidifies into a consolidated nugget of resolidified steel workpiece material 94. The welding laser beam 82 eventually finishes tracing the welding beam travel pattern 84 and, at that point, its transmission is ceased to conclude the laser joint formation stage of the overall laser welding method. The collective resolidified steel workpiece material 94 derived from operation of the welding laser beam 82 constitutes the laser weld joint 66 that autogenously fusion welds the steel workpieces 12, 14 together.

The laser weld joint 66, as previously mentioned, is located at least partially within the heat-treated region 64, which allows the formation of the weld joint 66 to benefit from the reduction of vaporizable zinc within the heat-treated region 64 to the extent of their integration. To ensure that the laser weld joint 66 encroaches into the heat-treated region 64, the welding beam travel pattern 84 may be configured on the top surface 20 of the stack-up 10 to at least partially overlap with the coverage area 76 of the pre-welding beam travel pattern 70 traced by the pre-welding laser beam 68, regardless of the geometric profiles of the pre-welding and the welding beam travel patterns 70, 84. A welding beam travel pattern 84 of which 50% or more, and preferably 85% or more, overlaps with the coverage area 76 of the pre-welding beam travel pattern 70 is considered adequate. To be sure, in a preferred embodiment, the welding beam travel pattern 84 traced by the welding laser beam 82 is entirely contained (i.e., 100% overlap) within the coverage area 76 of the pre-welding beam travel pattern 70 so that, as shown here in FIG. 11, the laser weld joint 66 is fully contained within the heat-treated region 64 at the top surface 20 of the workpiece stack-up 10.

FIGS. 1-11 illustrate the above-described embodiments of the disclosed laser welding method in the context of the workpiece stack-up being a "2T" stack-up that includes only the first and second steel workpieces 12, 14 with their single faying interface 34. The same laser welding method, however, may also be carried out when the workpiece stack-up, identified here by reference numeral 10', is a "3T" stack-up that includes an additional third steel workpiece 200, with a thickness 201, that overlaps and is situated between the first and second steel workpieces 12, 14, as depicted in FIGS. 12-17. In fact, regardless of whether the workpiece stack-up is a 2T or a 3T stack-up, the laser welding method does not have to be modified all that much to form, in sequence, the heat-treated region 64 and the laser weld joint 66 located at least partially within the heat-treated region 64. And, in each instance, the laser weld joint 66 can achieve good quality strength and other mechanical properties despite the fact that at least one, and maybe all, of the steel workpieces 12, 200, 14 includes a surface coating 40 comprised of a zinc-based material such as zinc (e.g., hot-dip galvanized or electrogalvanized) or a zinc alloy (e.g., galvanneal zinc-iron alloy).

Figure 12:
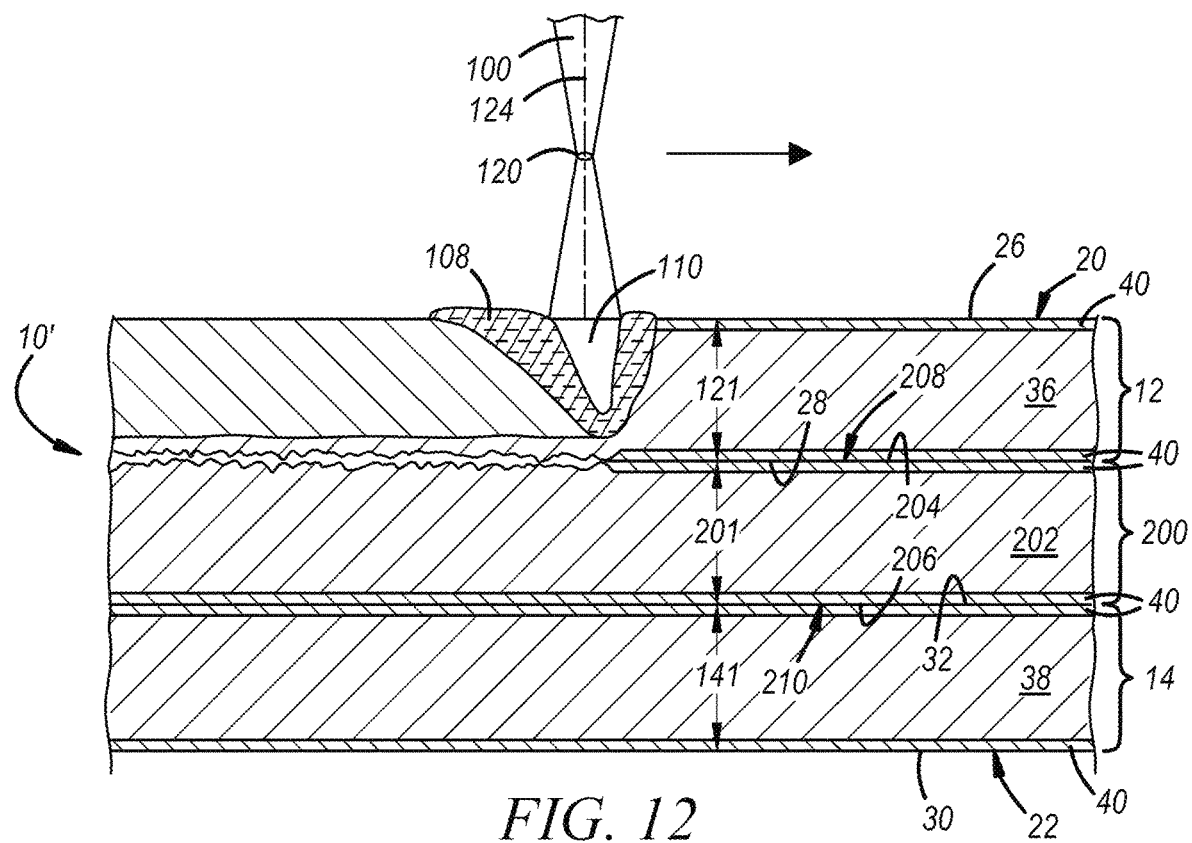
FIG. 12 is a cross-sectional view of an embodiment of the workpiece stack-up, which includes a first steel workpiece, a second steel workpiece, and a third steel workpiece, during heat treating of a region of the stack-up in which a first pre-welding laser beam is directed at the top surface of the workpiece stack-up to create a first preliminary molten steel pool that partially penetrates into the first steel workpiece during the time the first pre-welding laser beam is being advanced relative to a plane of the top surface along a first pre-welding beam travel pattern.
Figure 13:
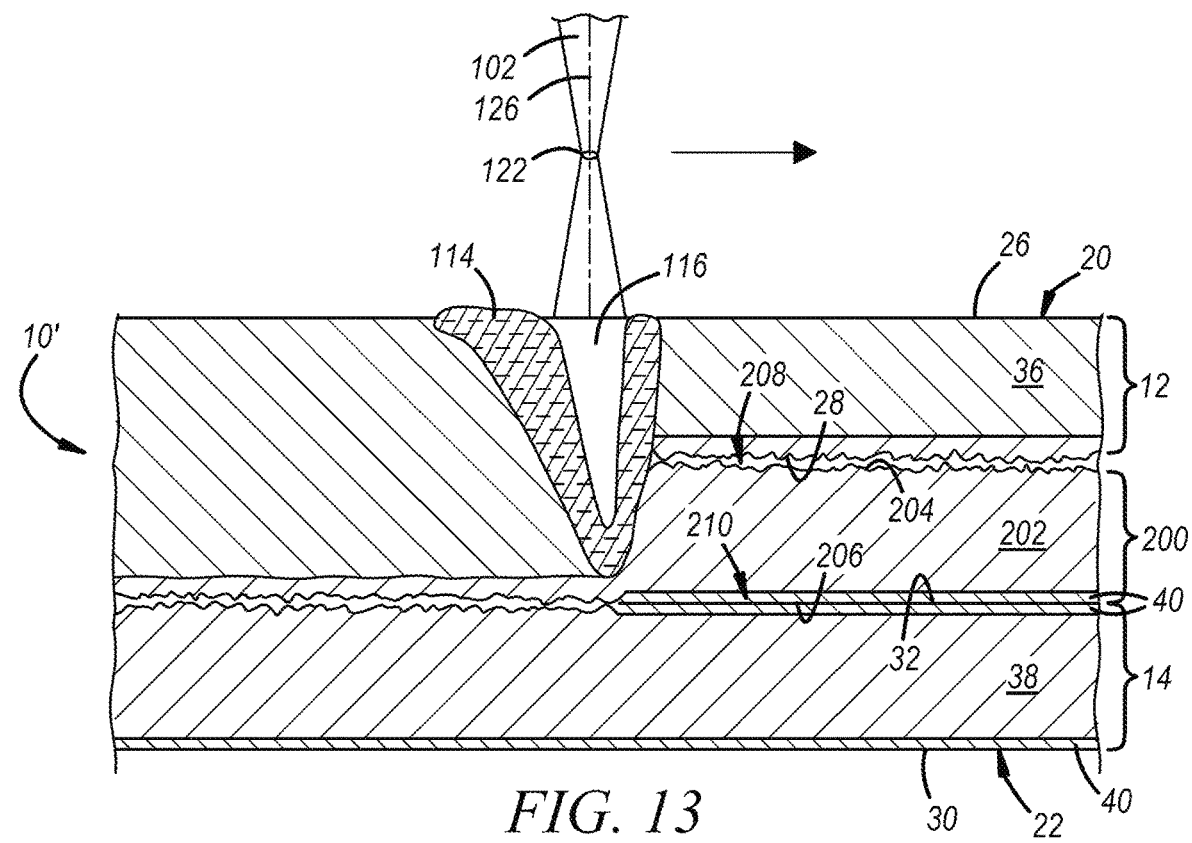
FIG. 13 is a cross-sectional view of the embodiment of the workpiece stack-up shown in FIG. 12 during heat treating of the region of the stack-up in which, after the first pre-welding laser beam has been advanced along its beam travel pattern, a second pre-welding laser beam is directed at the top surface of the workpiece stack-up to create a second preliminary molten steel pool that penetrates through the first steel workpiece and partially into the underlying adjacent third steel workpiece during the time the second pre-welding laser beam is being advanced relative to a plane of the top surface along a second pre-welding beam travel pattern that at least partially overlaps with the first pre-welding beam travel pattern.

Referring now to FIGS. 12-13, the additional third steel workpiece 200 includes a third base steel substrate 202 that may optionally be coated with the same surface coating 40 of a zinc-based material described above. When the workpiece stack-up 10' includes the first, second, and third steel workpieces 12, 200, 14, the base steel substrate 36, 202, 38 of at least one of the steel workpieces 12, 200, 14, and in some instances all of them, includes the surface coating 40; that is, one of the following scenarios applies: (1) only the first steel workpiece 12 includes a surface coating 40; (2) only the third steel workpiece 200 includes a surface coating 40; (3) only the second steel workpiece 14 includes a surface coating 40; (4) each of the first and third steel workpieces 12, 200 includes a surface coating 40; (5) each of the first and second steel workpieces 12, 14 includes a surface coating 40; or (6) each of the third and second steel workpieces 200, 14 includes a surface coating 40. As for the characteristics of the third base steel substrate 202, the descriptions above regarding the first and second base steel substrates 36, 38 are equally applicable to that substrate 202 as well. And while the same general descriptions apply to the several steel workpieces 12, 200, 14 in the stack-up 10', there is no requirement that the steel workpieces 12, 200, 14 be identical to one another. In many instances, the first, second, and third steel workpieces 12, 200, 14 are different in some aspect whether it be composition, thickness, being coated/uncoated, and/or form.

As a result of stacking the first, third, and second steel workpieces 12, 200, 14 in overlapping fashion to provide the workpiece stack-up 10', the third steel workpiece 200 has two faying surfaces: a third faying surface 204 and a fourth faying surface 206. The third faying surface 204 overlaps and confronts the first faying surface 28 of the first steel workpiece 12 and the fourth faying surface 206 overlaps and confronts the second faying surface 32 of the second steel workpiece 14. The confronting first and third faying surfaces 28, 204 of the first and third steel workpieces 12, 200 establish a first faying interface 208 and the confronting second and fourth faying surfaces 32, 206 of the second and third steel workpieces 14, 200 establish a second faying interface 210, both of which extend through the weld site 16. These faying interfaces 208, 210 are the same type and encompass the same attributes as the faying interface 34 already described above with respect to FIGS. 1-11. Consequently, in this embodiment as described herein, the exterior outer surfaces 26, 30 of the flanking first and second steel workpieces 12, 14 still face away from each other in opposite directions and continue to provide the top and bottom surfaces 20, 22 of the workpiece stack-up 10', respectively.

Figure 14:
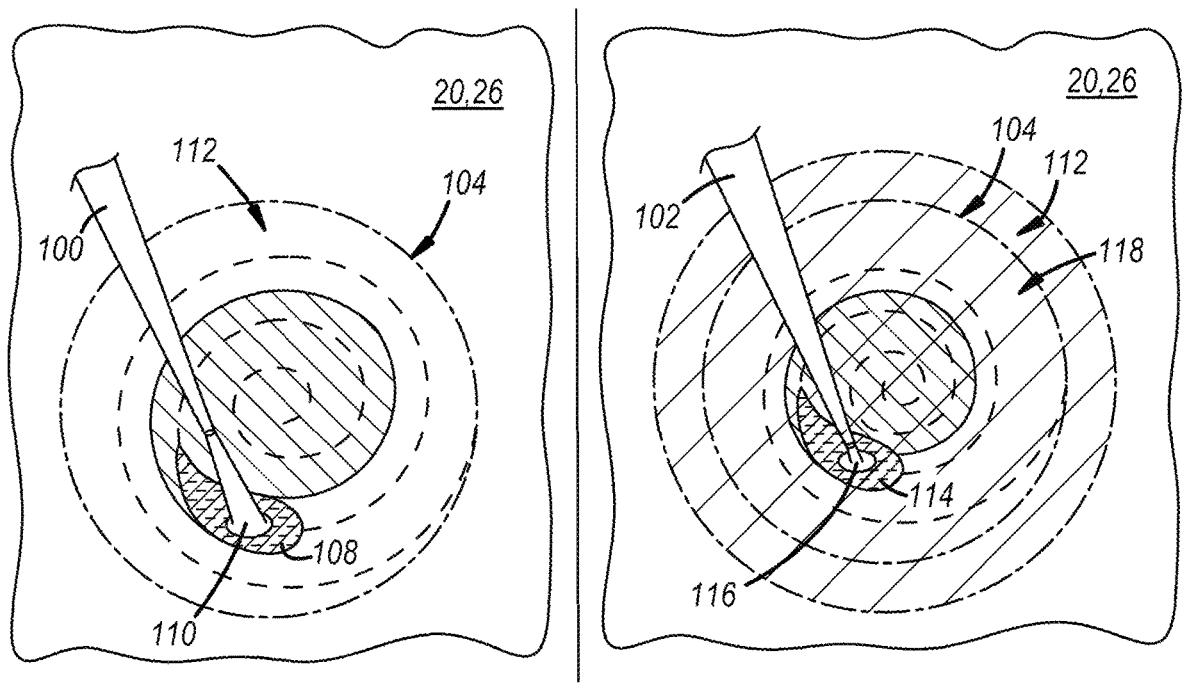
FIG. 14 is a plan view of the embodiment of the workpiece stack-up shown in FIGS. 12-13 and illustrates advancement of the first and second pre-welding laser beams relative to a plane of the top surface of the workpiece stack-up along certain particular implementations of the first and second pre-welding beam travel patterns.

The laser welding method applicable to the workpiece stack-up 10' having first, third, and second overlapping steel workpieces 12, 200, 14 is quite similar to the method already described and, accordingly, the description that follows will focus on the main differences between the two related versions of the disclosed method. Here, the most notable difference relates to the fashioning of the heat treated region 64 within the workpiece stack-up 10', which is accomplished by sequentially maneuvering a first pre-welding laser beam 100 and a second pre-welding laser beam 102 relative to the plane of the top surface 20 of the stack-up 10 along a first pre-welding beam travel pattern 104 and a second pre-welding beam travel pattern 106, respectively, as shown in FIGS. 12-14. The first pre-welding laser beam 100 and the second pre-welding laser beam 102 may be individually directed towards the top surface 20 of the workpiece stack-up 10' and advanced along their respective pre-welding beam travel patterns 104, 106 in succession by the remote laser welding apparatus 18 prior to formation of the laser weld joint 66 by the welding laser beam 82. The first and second pre-welding beam travel patterns 104, 106 may assume any of the geometric profiles shown and described above with respect to FIGS. 3-8 and, as such, a description of those several beam travel patterns need not be repeated.

To begin the heat-treatment, the first pre-welding laser beam 100 is directed at the top surface 20 of the workpiece stack-up 10' so that the laser beam 100 impinges the top surface 20 and creates a first preliminary molten steel pool 108 within the stack-up 10', as shown in FIGS. 12 and 14. The first preliminary molten steel pool 108 penetrates into the first steel workpiece 12 but does not traverse the first faying interface 208 of the first and third steel workpieces 12, 200 and extend into the underlying adjacent third steel workpiece 200. More specifically, the first preliminary molten steel pool 108 preferably extends from the top surface 20 to a depth that exceeds 50%, or more preferably at least 75%, of the thickness 121 of the first steel workpiece 12. The creation of the first preliminary molten steel pool 108 may optionally be accompanied by a keyhole 110 within and surrounded by the molten steel pool 108. After creation of the first preliminary molten steel pool 108, the first pre-welding laser beam 100 is advanced—and its beam spot is conveyed-relative to the plane of the top surface 20 of the workpiece stack-up 10' along the first pre-welding beam travel pattern 104 while maintaining the partial penetration of the first preliminary molten steel pool 108 into the first steel workpiece 12. A first coverage area 112 of the first pre-welding beam travel pattern 104 may range from 12 $mm^2$ to 115 $mm^2$ or, more narrowly, from 28 $mm^2$ to 65 $mm^2$, similar to before.

Once the first pre-welding laser beam 100 has finished tracing the first pre-welding beam travel pattern 104 and its transmission has ceased, the second pre-welding laser beam 102 is directed at the top surface 20 of the workpiece stack-up 10' so that the laser beam 102 impinges the top surface 20 and creates a second preliminary molten steel pool 114 within the stack-up 10', as shown in FIG. 13-14. The second preliminary molten steel pool 114 penetrates through the first steel workpiece 12 and into the underlying adjacent third steel workpiece 200, but does not traverse the second faying interface 210 of the third and second steel workpieces 200, 14 and extend into the second steel workpiece 14. More specifically, the second preliminary molten steel pool 114 preferably extends from the top surface 20 to a depth that exceeds 50%, or more preferably at least 75%, of the thickness 201 of the third steel workpiece 200. The creation of the second preliminary molten steel pool 114 may optionally be accompanied by a keyhole 116 within and surrounded by the molten steel pool 114. After creation of the second preliminary molten steel pool 114, the second pre-welding laser beam 102 is advanced—and its beam spot is conveyed—relative to the plane of the top surface 20 of the workpiece stack-up 10' along the second pre-welding beam travel pattern 106 while maintaining the partial penetration of the second preliminary molten steel pool 114 into the third steel workpiece 200. A second coverage area 118 of the second pre-welding beam travel pattern 106 may also range from 12 mm$^2$ to 115 mm$^2$ or, more narrowly, from 28 mm$^2$ to 65 mm$^2$.

The penetration depth of the first and second preliminary molten steel pools 108, 114 is arrived at and maintained over the course of the first and second pre-welding laser beams 100, 102 advancement along their respective pre-welding beam travel patterns 104, 106 by controlling certain beam characteristics of the pre-welding laser beams 100, 102. The first pre-welding laser beam 100 may, for example, have a power level that ranges from 0.5 kW to 10 kW and may be advanced along the first pre-welding beam travel pattern 104 at a travel speed that ranges from 2 m/min to 20 m/min while a focal position of the laser beam 100 is defocused and positioned between +10 mm and +100 mm. As for the second pre-welding laser beam 102, it may have a power level that ranges from 2 kW to 10 kW and may be advanced along the second pre-welding beam travel pattern 106 at a travel speed that ranges from 2 m/min to 20 m/min while a focal position of the laser beam 102 is defocused and positioned between +10 mm and +100 mm. The focal positions of the first and second pre-welding laser beams 100, 102 refers to the distance between a focal point 120, 122 along a longitudinal axis 124, 126 relative to the top surface 20 of the workpiece stack-up 10' with the same +/− designations as previously described.

Figure 17:
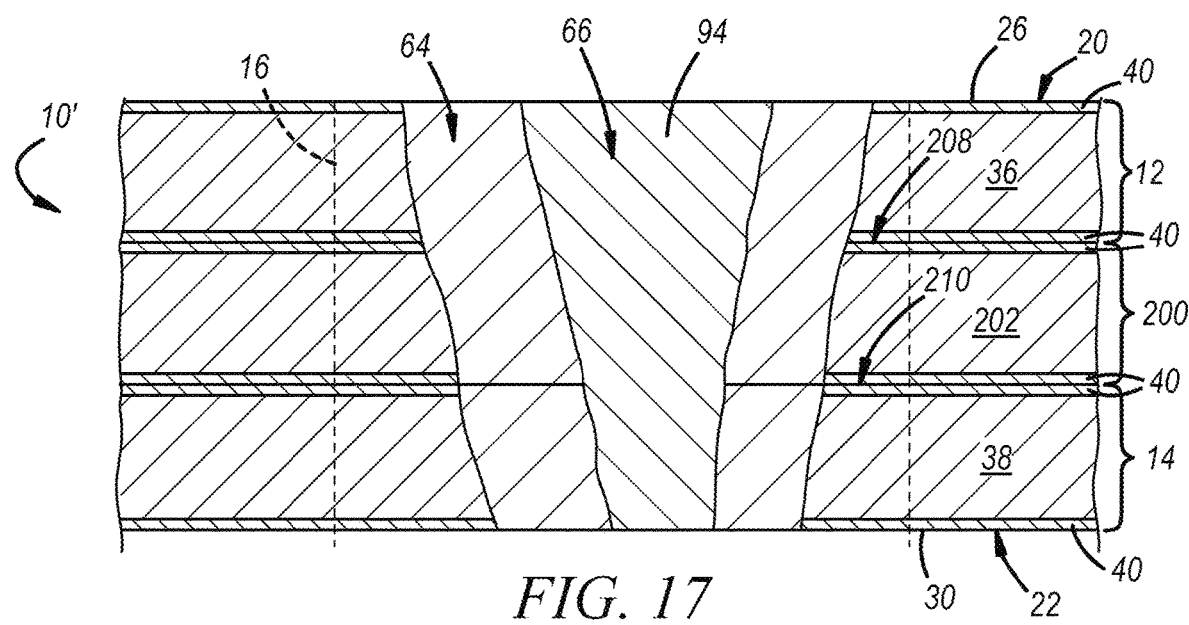
FIG. 17 is a cross-sectional view of the laser weld joint formed by the welding laser beam that depicts the weld joint being fully contained within the heat-treated region of the workpiece stack-up at the top surface of the stack-up.

Referring now specifically to FIGS. 14 and 17, the advancement of the first and second pre-welding laser beams 100, 102 along their respective pre-welding beam travel patterns 104, 106, and the resultant translation of the first and second preliminary molten steel pools 108, 114 along a corresponding route within the workpiece stack-up 10' at their designated penetration depths, establishes the heat-treated region 64. As shown in FIG. 17—which depicts the workpiece stack-up 10' in cross-section following both heat-treatment and the formation of the laser weld joint 66—the heat-treated region 64 is a three-dimensional penetrating region that extends into the workpiece stack-up 10' from the top surface 20. The heat-treated region 64 includes the steel material that has been melted by either the first pre-welding laser beam 100, the second pre-welding laser beam 102, or both, and then resolidified as well as the surrounding heat-affected zone, and is typically tapered as it extends towards the bottom surface 22 of the workpiece stack-up 10'. The heat-treated region 64 may extend all the way to the bottom surface 22 of the stack-up 10', as shown, or it may extend only partway to the bottom surface 22.

The fashioning of the heat-treated zone 64 with the pre-welding laser beams 100, 102 is accompanied by heating and vaporizing at least one surface coating 40 of a zinc-based material to reduce the amount of vaporizable zinc in the region 64. For instance, and similar to the description above, if a surface coating 40 is present at the exterior outer surface 26 of the first steel workpiece 12, the advancement of the first and/or second pre-welding laser beams 100, 102 and the corresponding translation of the upper portion of the first and/or second preliminary molten steel pool 108, 114 along the exterior outer surface 26 (also the top surface 20 of workpiece stack-up 10') heats and vaporizes the surface coating 40 and expels released zinc vapors to the surrounding environment. Likewise, the heat conducted from the first and/or second preliminary molten steel pools 108, 114 into the second steel workpiece 14 may be sufficient, in some instances, to heat and vaporize a surface coating 40 at the exterior outer surface 30 of the second steel workpiece 14, if such a surface coating 40 is present, although the quantity of vaporizable zinc that is released at that surface 30 is likely to be less than the quantity that is released at the exterior outer surface 26 of the first steel workpiece 12.

As another possibility, if a surface coating 40 is present at any of the faying surfaces 28, 204, 32, 206, the sequential use of the first and second pre-welding laser beams 100, 102 to fashion the heat-treated region 64 can help effectively release and drive zinc vapors laterally outward along the faying interface(s) 208, 210. Indeed, by initially tracing the first pre-welding beam travel pattern 104 with the first pre-welding laser beam 100, zinc-based material can be vaporized and expelled to the surrounding environment from the exterior outer surface 26 of the first steel workpiece 12 and driven laterally outward along the first faying interface 208 to the extent that a surface coating 40 is present at either or both of those locations. Then, by tracing the second pre-welding beam travel pattern 106 with the second pre-welding laser beam 102, zinc-based material can be driven laterally outward along the second faying interface 210 as well as possibly expelled to the surrounding environment from the exterior outer surface 28 of the second steel workpiece 14 to the extent that a surface coating 40 is present at either or both of those locations. Additionally, the first faying surface 28 may be roughened by the first preliminary molten steel pool 108 and/or the fourth faying surface 206 may be roughened by the second preliminary molten steel pool 114 if the applicable molten steel pool 108, 114 penetrates to a depth that exceeds at least 75% of the thickness 121, 201 of its respective steel workpiece 12, 200, which can further enhance zinc vapor venting.

The removal of vaporizable zinc from the heat-treated region 64 minimizes or even virtually eliminates the amount of zinc vapors produced during the subsequent formation of the laser weld joint 66, which is located at least partially within the heat-treated region 64, thus resulting in less porosity in the subsequently-formed laser the weld joint 66 as well as a lower tendency to produce spatter and blowholes. To help in this regard, the first pre-welding beam travel pattern 104 and the second pre-welding beam travel pattern 106 are configured such that the first and second coverage areas 112, 118 at least partially overlap on the top surface 20 of the workpiece stack-up 10 to provide a shared coverage area portion 128, as depicted in FIG. 14. The shared coverage area portion 128 is the area through which both the first and second pre-welding laser beams 100, 102 are advanced. It is preferred that at least 50% of the second coverage area 118 is included in the shared coverage area portion 128. In one particularly preferred implementation, the second coverage area 118 of the second beam travel pattern 106 is equal in size and superposed to match and overlap entirely onto the first coverage area 112 of the first beam travel pattern 104, or the second coverage area 118 is smaller in size and overlaps entirely with, and is spanned by, the first coverage area 112, both of which result in 100% of the second coverage area 118 being included in the shared coverage area portion 128.

Figure 16:
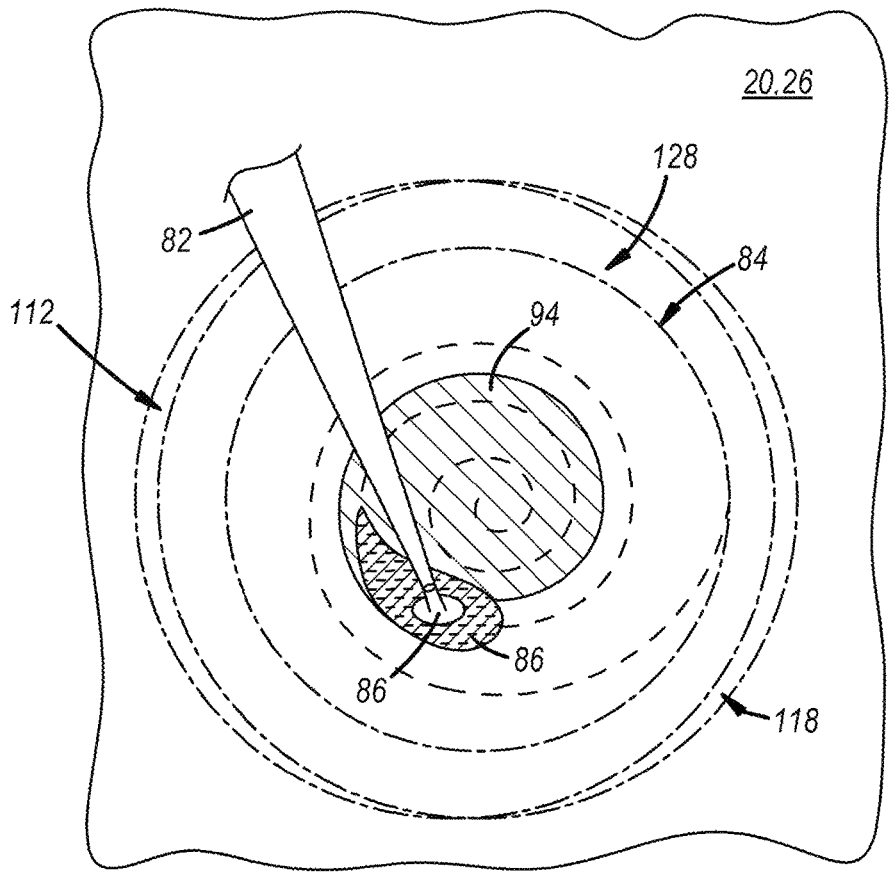
FIG. 16 is a plan view of the embodiment of the workpiece stack-up shown in FIG. 15 and illustrates advancement of the welding laser beam relative to a plane of the top surface of the stack-up along one particular implementation of a welding beam travel pattern that at least partially overlaps with a shared coverage area portion of the first and second pre-welding beam travel patterns associated with the first and second pre-welding laser beams.
Figure 15:
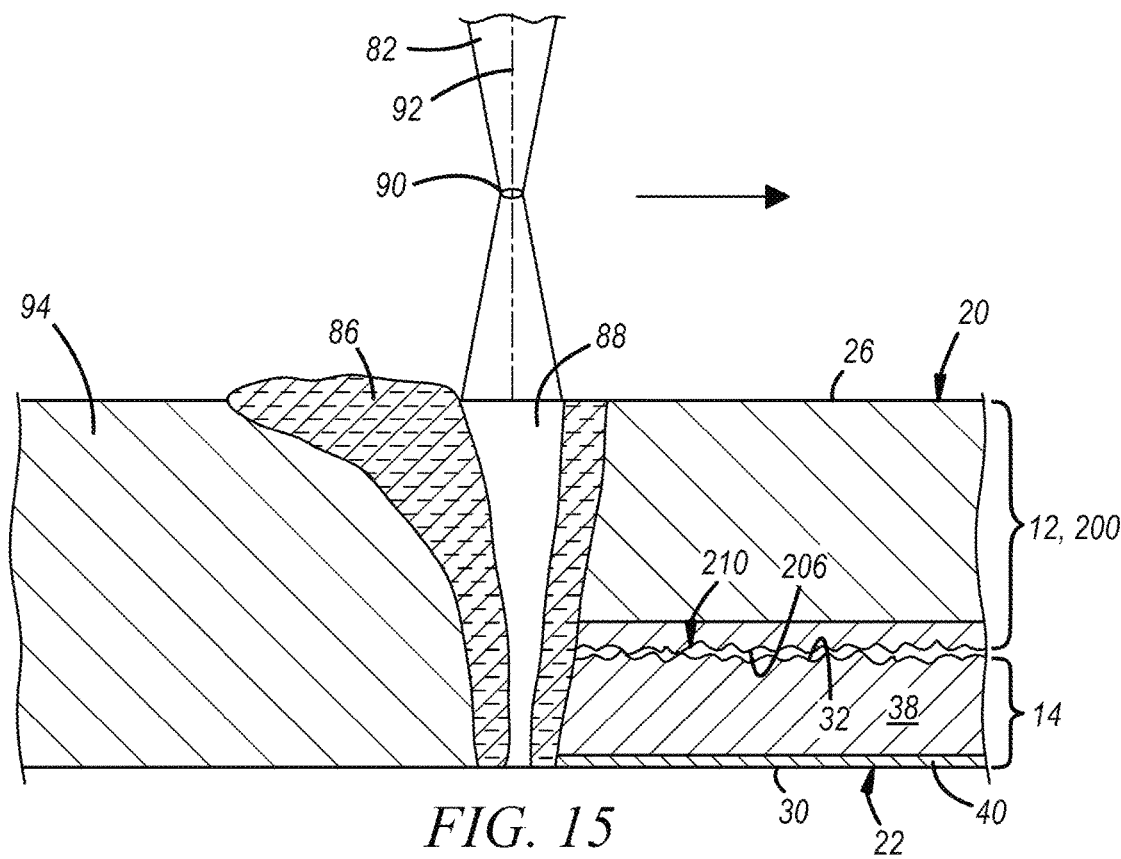
FIG. 15 is a cross-sectional view of the embodiment of the workpiece stack-up shown in FIGS. 12-13 during formation of a laser weld joint with a welding laser beam after the designated region of the stack-up has been heat-treated, wherein the welding laser beam is directed at a top surface of the workpiece stack-up to create a primary molten steel pool that penetrates into the workpiece stack-up and traverses both faying interface established within the stack-up at least part of the time during advancement of the welding laser beam along the welding beam travel pattern.

After fashioning of the heat-treated region 64 within the workpiece stack-up 10' using with first and second pre-welding laser beams 100, 102, the laser weld joint 66 is formed by the welding laser beam 82 in essentially the same was as previously described; that is, the welding laser beam 82 is maneuvered relative to the plane of the top surface 20 along the welding beam travel pattern 84 such that the resultant laser weld joint 66 is formed and located at least partially within the heat-treated region 64. This is accomplished by directing the welding laser beam 82 at the top surface 20 of the workpiece stack-up 10' such that the laser beam 82 impinges the top surface 20 and creates the primary molten steel pool 86 that penetrates into the workpiece stack-up 10' from the top surface 20 towards the bottom surface 22, as shown in FIG. 15. The primary molten steel pool 86 is preferably accompanied by the keyhole 88 as before. Once the primary steel pool 86 is created, the welding laser beam 82 is advanced—and its beam spot is conveyed—relative to the plane of the top surface 20 of the workpiece stack-up 10' along the welding beam travel pattern 84, as shown in FIG. 16. The primary molten steel pool 86 and the keyhole 88 penetrate into the workpiece stack-up 10' from the top surface 20 towards the bottom surface 22 and traverse each of the faying interfaces 208, 210 during at least part of the time that the welding laser beam 82 is being advanced along the welding beam travel pattern 84.

To achieve and maintain the desired penetration depth of the primary molten steel pool 86 during its advancement along the welding beam travel pattern 84, certain characteristics of the welding laser beam 82 may be set in a combination that provides the appropriate instantaneous heat input into the workpiece stack-up 10', as before with the first and second pre-welding laser beams 100, 102. For example, the welding laser beam 82 may have a power level that ranges from 2 kW to 10 kW and may be advanced along the welding beam travel pattern 84 at a travel speed that ranges from 2 m/min to 20 m/min or while a focal position of the laser beam 82 is positioned between 0 mm and +30 mm relative to the top surface 20 of the stack-up 10'. The term "focal position" refers to the same distance between the focal point 90 of the laser beam 82 and the top surface 20 of the workpiece stack-up 10' as shown in FIG. 10 and described previously. And, although the geometric profile of the welding beam travel pattern 84 may vary, the general and specific geometric profiles of the welding beam travel pattern 84 may be the same as previously described and, therefore, need not be described in detail again.

The advancement of the welding laser beam 82 along the welding beam travel pattern 84 translates the primary molten steel pool 86 along a corresponding route within the workpiece stack-up 10'. This causes the penetrating primary molten steel pool 86 to flow around and behind the beam spot of the welding laser beam 82 within the workpiece stack-up 10', resulting in the molten steel pool 86 elongating in the wake of the advancing progression of the laser beam 82. And, as before, the molten steel produced by the advancing laser beam 82 quickly solidifies into resolidified steel workpiece material 94 including a portion that extends from the top surface 20 of the stack-up 10' and across the faying interfaces 208, 210, preferably all the way to the bottom surface 22 of the stack-up, as shown in FIGS. 15 and 17. Moreover, depending on the geometric profile of the welding beam travel pattern 84, the primary molten steel pool 86 may solidify into a defined trail of resolidified steel workpiece material 94, or it may merge and grow into a larger melt puddle that solidifies into a consolidated nugget of resolidified steel workpiece material 94. The welding laser beam 82 eventually finishes tracing the welding beam travel pattern 84 and, at that point, its transmission is ceased to conclude the laser joint formation stage of the overall laser welding method. The collective resolidified steel workpiece material 94 derived from operation of the welding laser beam 82 constitutes the laser weld joint 66 that autogenously fusion welds the steel workpieces 12, 14 together.

The location of the laser weld joint 66 at least partially within the heat-treated region 64 allows the formation of the weld joint 66 to benefit from the reduction of vaporizable zinc within the heat-treated region 64 to the extent of their integration. To ensure that the laser weld joint 66 encroaches into the heat-treated region 64 and receives the benefit of the effects of the first and second pre-welding laser beams 100, 102, the welding beam travel pattern 84 may be configured on the top surface 20 of the stack-up 10 to at least partially overlap with the shared coverage area portion 128 of the first and second coverage areas 112, 118 of the first and second pre-welding beam travel patterns 104, 106, regardless of the geometric profiles of the pre-welding and the welding beam travel patterns 104, 106, 84. A welding beam travel pattern 84 of which 50% or more, and preferably 85% or more, overlaps with the shared coverage area portion 128 is considered adequate. What is more, in a preferred embodiment, the welding beam travel pattern 84 traced by the welding laser beam 82 is entirely contained (i.e., 100% overlap) within the shared coverage area portion 128 of the first and second pre-welding beam travel patterns 104, 106 so that, as shown here in FIG. 17, the laser weld joint 66 is fully contained within the heat-treated region 64 at the top surface 20 of the workpiece stack-up 10.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser welding overlapping steel workpieces, the method comprising:

providing a workpiece stack-up that includes overlapping steel workpieces, the workpiece stack-up comprising a first steel workpiece, a second steel workpiece, and a third steel workpiece situated between the first and second steel workpieces, the first steel workpiece having an exterior outer surface and a first faying surface, the second steel workpiece having an exterior outer surface and a second faying surface, and the third steel workpiece having opposed third and fourth faying surfaces, the exterior outer surface of the first steel workpiece providing a top surface of the workpiece stack-up, the exterior outer surface of the second steel workpiece providing a bottom surface of the workpiece stack-up, the third faying surface of the third steel workpiece overlapping and confronting the first faying surface of the first steel workpiece to establish a first faying interface, and the fourth faying surface of the third steel workpiece overlapping and confronting the second faying surface of the second steel workpiece to establish a second faying interface, and wherein at least one of the steel workpieces in the workpiece stack-up includes a surface coating of a zinc-based material;

heat-treating a region of the workpiece stack-up to reduce an amount of vaporizable zinc within the region, the heat-treating comprising (i) directing a pre-welding laser beam at the top surface of the workpiece stack-up such that the pre-welding laser beam impinges the top surface of the workpiece-stack up and creates a preliminary molten steel pool that penetrates into but not through the first steel workpiece, and (ii) advancing the pre-welding laser beam relative to a plane of the top surface of the workpiece stack-up along a pre-welding beam travel pattern having a coverage area, the advancement of the pre-welding laser beam along the pre-welding beam travel pattern causing the preliminary molten steel pool to be translated along a corresponding route within the workpiece stack-up to thereby thermally distort the first steel workpiece and roughen the first faying surface and, further, to heat and vaporize zinc-based material within the workpiece stack-up;

directing a welding laser beam at the top surface of the workpiece stack-up after heat-treating, the welding laser beam impinging the top surface of the workpiece stack-up and creating a primary molten steel pool that penetrates into the workpiece stack-up from the top surface toward the bottom surface; and advancing the welding laser beam relative to the plane of the top surface of the workpiece stack-up along a welding beam travel pattern that comprises one or more nonlinear weld paths, the advancement of the welding laser beam along the welding beam travel pattern forming a laser weld joint located at least partially within the heat-treated region, the laser weld joint extending across each faying interface established within the workpiece stack-up and autogenously fusion welding the overlapping steel workpieces together.

2. The method set forth in claim 1, wherein advancing the welding laser beam along the welding beam travel pattern is performed by a scanning optic laser head having tiltable scanning mirrors whose movements are coordinated to move the welding laser beam relative to the plane of the top surface of the workpiece stack-up.

3. The method set forth in claim 1, wherein the laser weld joint is fully contained within the heat-treated region of the workpiece stack-up at the top surface of the stack-up.

4. The method set forth in claim 1, wherein the primary molten steel pool created by the welding laser beam partially penetrates the workpiece stack-up and thereby extends into the workpiece stack-up from the top surface, but does not reach the bottom surface, at least part of the time during advancement of the welding laser beam along the welding beam travel pattern.

5. The method set forth in claim 1, wherein the pre-welding beam travel pattern comprises a spiral weld path and an outer peripheral circular weld path that surrounds the spiral weld path, and wherein the outer peripheral circular weld path of the pre-welding beam travel pattern has a diameter that ranges from 5 mm to 10 mm.

6. The method set forth in claim 5, wherein the welding beam travel pattern comprises a spiral weld path and an outer peripheral circular weld path that surrounds the spiral weld path of the welding beam travel pattern, and wherein the outer peripheral circular weld path of the welding beam travel pattern has a diameter that ranges from 4 mm to 8 mm.

7. The method set forth in claim 1, wherein heat-treating a region of the workpiece stack-up comprises:

directing a first pre-welding laser beam at the top surface of the workpiece stack-up such that the first pre-welding laser beam impinges the top surface and creates a first preliminary molten steel pool that penetrates into the first steel workpiece but does not traverse the first faying interface and extend into the underlying adjacent third steel workpiece;

advancing the first pre-welding laser beam relative to the plane of the top surface of the workpiece stack-up along a first pre-welding beam travel pattern having a coverage area, the advancement of the first pre-welding laser beam along the first pre-welding beam travel pattern causing the first preliminary molten steel pool to be translated along a corresponding route within the workpiece stack-up to thereby thermally distort the first steel workpiece and roughen the first faying surface;

directing a second pre-welding laser beam at the top surface of the workpiece stack-up after advancement of the first pre-welding laser beam along the first pre-welding beam travel pattern, the second pre-welding laser beam impinging the top surface and creating a second preliminary molten steel pool that penetrates through the first steel workpiece and into the third steel workpiece, but does not traverse the second faying interface and extend into the underlying adjacent second steel workpiece; and advancing the second pre-welding laser beam relative to the plane of the top surface of the workpiece stack-up along a second pre-welding beam travel pattern having a coverage area, the advancement of the second pre-welding laser beam along the second pre-welding beam travel pattern causing the second preliminary molten steel pool to be translated along a corresponding route within the workpiece stack-up;

wherein the coverage area of the first pre-welding beam travel pattern and the coverage area of the second pre-welding beam travel pattern at least partially overlap to provide a shared coverage area portion on the top surface of the workpiece stack-up, and wherein the advancement of at least one of the first pre-welding laser beam along the first pre-welding beam travel pattern or the second pre-welding laser beam along the second pre-welding beam travel pattern operates to heat and vaporize at least one surface coating of a zinc-based material so as to reduce the amount of vaporizable zinc within the heat-treated region.

8. The method set forth in claim 7, wherein the welding beam travel pattern along which the welding laser beam is advanced overlaps entirely with the shared coverage area portion such that the laser weld joint is fully contained within the heat-treated region at the top surface of the workpiece stack-up.

9. The method set forth in claim 7, wherein each of the first pre-welding beam travel pattern and the second pre-welding beam travel pattern comprises a spiral weld path and an outer peripheral circular weld path that surrounds the spiral weld path, and wherein the outer peripheral circular weld path of each of the first pre-welding beam travel pattern and the second pre-welding beam travel pattern has a diameter that ranges from 5 mm to 10 mm.

10. The method set forth in claim 9, wherein the welding beam travel pattern comprises a spiral weld path and an outer peripheral circular weld path that surrounds the spiral weld path of the welding beam travel pattern, and wherein the outer peripheral circular weld path of the welding beam travel pattern has a diameter that ranges from 4 mm to 8 mm.

11. The method set forth in claim 1, wherein the surface coating of a zinc-based material included on at least one of the first, second, or third steel workpieces in the workpiece stack-up is hot-dip galvanized zinc or electrogalvanized zinc.

12. A method of laser welding overlapping steel workpieces, the method comprising:

providing a workpiece stack-up that includes first and second overlapping steel workpieces, the first steel workpiece having an exterior outer surface and a first faying surface and the second steel workpiece having an exterior outer surface and a second faying surface, the exterior outer surface of the first steel workpiece providing a top surface of the workpiece stack-up and the exterior outer surface of the second steel workpiece providing a bottom surface of the workpiece stack-up, wherein the first and second faying surfaces of the first and second steel workpieces overlap and confront to establish a faying interface, and wherein at least one of the first or second steel workpieces comprises a surface coating of a zinc-based material;

directing a pre-welding laser beam at the top surface of the workpiece stack-up such that the pre-welding laser beam impinges the top surface and creates a preliminary molten steel pool that penetrates into the first steel workpiece but does not traverse the faying interface of the first and second steel workpieces and extend into the second steel workpiece;

advancing the pre-welding laser beam relative to a plane of the top surface of the workpiece stack-up along a pre-welding beam travel pattern having a coverage area, the advancement of the pre-welding laser beam along the pre-welding beam travel pattern causing the preliminary molten steel pool to be translated along a corresponding route within the workpiece stack-up resulting in at least one surface coating of a zinc-based material being vaporized to release zinc vapors; and, thereafter forming a laser weld joint by advancing a welding laser beam along a welding beam travel pattern that at least partially overlaps with the coverage area of the pre-welding beam travel pattern of the pre-welding laser beam, the laser weld joint being comprised of resolidified steel workpiece material and extending into the workpiece stack-up across the faying interface so as to fusion weld the first and second steel workpieces together, wherein the welding beam travel pattern along which the welding laser beam is advanced to form the laser weld joint overlaps entirely with the coverage area of the pre-welding beam travel pattern of the pre-welding laser beam, and wherein the welding beam travel pattern comprises a spiral weld path and an outer peripheral circular weld path that surrounds the spiral weld path.

13. A method of laser welding overlapping steel workpieces, the method comprising:

providing a workpiece stack-up that includes first, second, and third overlapping steel workpieces, the first steel workpiece having an exterior outer surface and a first faying surface and the second steel workpiece having an exterior outer surface and a second faying surface, the exterior outer surface of the first steel workpiece providing the top surface of the workpiece stack-up and the exterior outer surface of the second steel workpiece providing the bottom surface of the workpiece stack-up such that the third steel workpiece is situated between the first and second steel workpieces, the third steel workpiece having opposed third and fourth faying surfaces, wherein the third faying surface overlaps and confronts the first faying surface of the first steel workpiece to establish a first faying interface and the fourth faying surface overlaps and confronts the second faying surface of the second steel workpiece to establish a second faying interface, and wherein at least one of the first, second, or third steel workpieces comprises a surface coating of a zinc-based material;

advancing a first pre-welding laser beam relative to a plane of the top surface of the workpiece stack-up along a first pre-welding beam travel pattern having a coverage area, the advancement of the first pre-welding laser beam along the first pre-welding beam travel pattern causing a first preliminary molten steel pool to be translated along a corresponding route within the workpiece stack-up, the first preliminary molten steel pool penetrating into the first steel workpiece without traversing the first faying interface and extending into the underlying adjacent third steel workpiece;

advancing a second pre-welding laser beam relative to the plane of the top surface of the workpiece stack-up along a second pre-welding beam travel pattern having a coverage area that at least partially overlaps with the coverage area of the first pre-welding beam travel pattern of the first pre-welding laser beam, the advancement of the second pre-welding laser beam along the second pre-welding beam travel pattern causing a second preliminary molten steel pool to be translated along a corresponding route within the workpiece stack-up, the second preliminary molten steel pool penetrating through the first steel workpiece and into the third steel workpiece without traversing the second faying interface and extending into the underlying adjacent second steel workpiece; and forming a laser weld joint by advancing a welding laser beam along a welding beam pattern that at least partially overlaps with a shared coverage area portion of the first and second pre-welding beam travel patterns, the laser weld joint being comprised of resolidified steel workpiece material and extending into the workpiece stack-up across the first faying interface and the second faying interface so as to fusion weld the first, second, and third steel workpieces together.

14. The method set forth in claim 13, wherein the welding beam travel pattern along which the welding laser beam is advanced to form the laser weld joint overlaps entirely with the shared coverage area portion of the first and second pre-welding beam travel patterns.

15. The method set forth in claim 13, wherein the welding beam travel pattern comprises a spiral weld path and an outer peripheral circular weld path that surrounds the spiral weld path.

* * * * *